(12) United States Patent
Yerli et al.

(10) Patent No.: US 12,148,103 B2
(45) Date of Patent: Nov. 19, 2024

(54) HEAD-TRACKING BASED MEDIA SELECTION FOR VIDEO COMMUNICATIONS IN VIRTUAL ENVIRONMENTS

(71) Applicant: TMRW Foundation IP S. À R.L., Luxembourg (LU)

(72) Inventors: Cevat Yerli, Frankfurt am Main (DE); Robert H. Black, Hoylake (GB)

(73) Assignee: TMRW FOUNDATION IP S.ÀR.L., Luxembourg (LU)

( * ) Notice: Subject to any disclaimer, the term of this patent is extended or adjusted under 35 U.S.C. 154(b) by 289 days.

(21) Appl. No.: 17/709,093

(22) Filed: Mar. 30, 2022

(65) Prior Publication Data

US 2023/0316663 A1    Oct. 5, 2023

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/012* (2013.01); *G06T 7/73* (2017.01); *G06T 13/40* (2013.01);
(Continued)

(58) Field of Classification Search
None
See application file for complete search history.

(56) References Cited

U.S. PATENT DOCUMENTS 10,573,061 B2    2/2020  Sun et al.
2017/0339372 A1  11/2017  Valli
(Continued)

FOREIGN PATENT DOCUMENTS

| | | |
|---|---|---|
| EP | 3962074 A1 | 3/2022 |
| WO | 2003058518 A2 | 7/2003 |
| WO | 2003058518 A3 | 7/2003 |

OTHER PUBLICATIONS

Goorts, P., et al., "Bringing 3D Vision to the Web: Acquiring Motion Parallax Using Commodity Cameras and Webgl", International Conference on 3D Imaging, Dec. 2013, 6 pages.
(Continued)

*Primary Examiner* — Tapas Mazumder
(74) *Attorney, Agent, or Firm* — BRYAN CAVE LEIGHTON PAISNER LLP

(57) ABSTRACT

A method enabling head-tracking-based media selection for video communications implemented by a system is provided, comprising implementing a 3D virtual environment configured to be accessed by a plurality of client devices, each having a corresponding user graphical representation within the 3D virtual environment, each user graphical representation having a corresponding virtual camera; receiving head tracking metadata of a first client device that comprises 6 degrees of freedom head tracking information generated in response to tracking movement of key facial landmarks; identifying graphical elements within a field of view of the virtual camera of a second client device, wherein the identified graphical elements comprise the user graphical representation of the first user; and sending, to the second client device, the head tracking metadata and the identified graphical elements.

18 Claims, 15 Drawing Sheets

(51) Int. Cl.
*G06T 7/73* (2017.01)
*G06T 13/40* (2011.01)
*G06V 40/16* (2022.01)

(52) U.S. Cl.
CPC .......... *G06V 40/162* (2022.01); *G06V 40/166* (2022.01); *G06V 40/171* (2022.01)

(56) References Cited

U.S. PATENT DOCUMENTS

| | | | | |
|---|---|---|---|---|
| 2018/0253593 A1* | 9/2018 | Hu | ........................ | G06V 40/171 |
| 2019/0297304 A1 | 9/2019 | Li | | |
| 2020/0099891 A1 | 3/2020 | Valli et al. | | |
| 2021/0319403 A1* | 10/2021 | Platt | .................... | H04L 65/4053 |
| 2023/0051068 A1* | 2/2023 | Jo | ........................... | G06F 3/011 |

OTHER PUBLICATIONS

Sims Smith, "Tutorial : Turn your webcam into head tracking for flight simulator and other games for free," YouTube, URL: https://www.youtube.com/watch?v=LPlahUVPx40, Aug. 2020, 3 pages.
Sim Racing Corner, "FaceTrackNOIR—Amazing head-tracking boost with a cheap PlayStation 3 EYE camera!," YouTube, URL: https://www.youtube.com/watch?v=imx6Lb8CYIM, Dec. 2018, 2 pages.
Audun Oygard, "Head tracking with WebRTC," Dev.Opera, URL: https://dev.opera.com/articles/head-tracking-with-webrtc/, Jul. 2012, 6 pages.
Sim Racing Corner, "FaceTrackNOIR—Amazing head-tracking boost with a cheap PlayStation 3 EYE camera!," YouTube, URL: https://www.youtube.com/watch?v=imx6Lb8CYtM, Dec. 2018, 2 pages.
Shyam Prathish Sargunam et al., "Guided Head Rotation and Amplified Head Rotation: Evaluating Semi-natural Travel and Viewing Techniques in Virtual Reality", Texas A&M University, pp. 19-28.
Sam Tregillus et al., "Handsfree Omnidirectional VR Navigation using Head Tilt", Experiences with Virtual Reality, CHI 2017, May 6-11, 2017, Denver, CO, USA, pp. 4063-4068.
Ryan P. Spicer et al., "The Mixed Reality of Things: Emerging Challenges for Human-Information Interaction", University of Southern California and the U.S. Army Research Laboratory, Proc. of SPIE vol. 10207 102070A-1, 12 pages.
Rongkai Shi et al., "Exploring Head-based Mode-Switching in Virtual Reality", 10 pages.
JVRB—Journal of Virtual Reality and Broadcasting, Stefan Marks et al., "Head Tracking Based Avatar Control for Virtual Environment Teamwork Training", https://www.jvrb.org/past-issues/9.2012/3560/?searchterm=None, 20 pages.

* cited by examiner

HEAD-TRACKING BASED MEDIA SELECTION FOR VIDEO COMMUNICATIONS IN VIRTUAL ENVIRONMENTS

FIELD

The current disclosure relates generally to computer systems, and more specifically, to a head-tracking based media selection for video communications in virtual environments.

BACKGROUND

Situations such as pandemics in the last years have paved the way for an acceleration in the development of technologies allowing us to meet, learn, shop work, collaborate remotely and interact. Various solutions are already available in the market to enable real-time communication and collaboration, ranging from chat applications to video telephony, such as Skype™ and Zoom™, or virtual offices for remote teams represented by 2D avatars, such as those provided by Pragli™.

Given the current state of development of wearable immersive technologies such as extended reality (e.g., augmented and/or virtual reality) and the relatively low technological appropriation rate, it is understandable that most solutions provide a flat, two-dimensional user interface where most interactions take place. A less complicated option includes providing such interactions in flat screens, such as on computer or mobile device displays, where user avatars are placed in a virtual environment presented in the display. In some cases, the avatars can provide a first-person view to a user so that the user can view the scene and the avatars of other users, increasing the realism of the interactions. The selection of the media to be provided to each user usually depends on the field of view of the user, which is typically adjusted by the movement of a mouse or input through a keyboard or controller. However, those media selection options and corresponding user experiences stay short of providing a satisfactory level of realism. For example, in real-life meetings, people are free to look around with their head while doing work on their computers with their hands, which is not possible with normal video conferencing platforms.

What is required is a technological solution that provides users with a feeling of realism and feeling of presence of themselves and the participants when remotely interacting without the need to purchase expensive equipment (e.g., as in head-mounted displays), and to implement new or costly infrastructures, all while using existing computing devices and cameras. These methods should enable alternative media selection mechanisms that match the realistic environments and user experiences provided.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect of the current disclosure, a method enabling head-tracking-based media selection for video communications implemented by a computer system is provided. The method comprises implementing a 3D virtual environment configured to be accessed by a plurality of client devices, each having a corresponding user graphical representation within the 3D virtual environment, each user graphical representation having a corresponding virtual camera comprising a view of the 3D virtual environment presented through a display to the corresponding users of the client devices, wherein the system enables exchanging video and audio data between users of the 3D virtual environment to provide video communications in the 3D virtual environment; receiving head tracking metadata of a first client device that comprises 6 degrees of freedom head tracking information generated in response to tracking movement of key facial landmarks obtained from video of a face of a first user of the first client device, wherein a first virtual camera comprises a view of the 3D virtual environment presented to the first user; identifying graphical elements within a field of view of a second virtual camera comprising a view of the 3D virtual environment presented to a second user of a second client device, wherein the identified graphical elements comprise a user graphical representation of the first user; and sending, to the second client device, the head tracking metadata of the first client device and the identified graphical elements.

In one embodiment, the method further comprises using, by the second client device, the head tracking metadata to adjust the movement of the head of the identified user graphical representation of the first user; and rendering and presenting the modified presentation of the second virtual camera including the user graphical representation of the first user and corresponding graphical elements.

In one embodiment, the method further comprises associating the view of the first virtual camera to the coordinates of the key facial landmarks; tracking movement of the key facial landmarks in 6 degrees of freedom based on the movement of the head of the first user; and adjusting the position and orientation of the first virtual camera based on the tracked movement of the key facial landmarks. The method may further include dynamically selecting the elements of the virtual environment based on the adjusted position of the virtual camera; and presenting the selected elements of the virtual environment to the corresponding client device.

In further embodiments, adjusting the position and orientation of the virtual camera is based on the tracked movement of the key facial landmarks comprises implementing threshold values to one or more of the degrees of freedom to limit the adjustments in the position and orientation of the virtual camera. In yet further embodiments, the method comprises implementing the threshold values such that the movement of the head in each of the degrees of freedom results in a corresponding change of the virtual camera only after reaching the threshold value. In another embodiment, the method comprises implementing the threshold values such that the movement of the virtual camera associated with the movement of the head in each of the degrees of freedom is stopped after reaching the threshold value. In another embodiment, the method comprises applying a multiplier value to one or more of the degrees of freedom, resulting in an increased movement of the virtual camera with respect to each movement of the head. In another embodiment, the method comprises inverting the direction of the adjustments of the position and orientation of the virtual camera with respect to the tracked movements of the key facial landmarks.

In further embodiments, the 3D virtual environment includes positions for the user graphical representations and their corresponding virtual cameras arranged in a geometry, wherein the adjustments of the position and orientation of the virtual cameras are controlled based on a horizontal rotation or lateral movement of the key facial landmarks so that the virtual cameras are moved on a predetermined path arranged in the geometry. In further embodiments, the method comprises associating one or more axes of movement of the virtual camera to one or more head movements.

In one embodiment, the method comprises generating the user graphical representations from the color image frames obtained by a color camera; and inserting the generated user graphical representations into a three-dimensional coordinate of the 3D virtual environment.

In another aspect of the current disclosure, a system enabling head-tracking-based media selection for video communications comprises at least one computer of a computer system with memory and at least one processor implementing a 3D virtual environment configured to be accessed by a plurality of client devices, each having a corresponding user graphical representation within the 3D virtual environment, each user graphical representation having a corresponding virtual camera comprising a view of the 3D virtual environment presented through a display to the corresponding users of the client devices; a data exchange management module implemented in memory and configured to receive head tracking metadata of a first client device that comprises 6 degrees of freedom head tracking information generated in response to tracking movement of key facial landmarks obtained from video of a face of a first user of the first client device, wherein a first virtual camera comprises a view of the 3D virtual environment presented to the first user; and a machine vision module implemented in memory and configured to identify graphical elements within a field of view of a second virtual camera comprising a view of the 3D virtual environment presented to a second user of at least one second client device, wherein the identified graphical elements comprise a user graphical representation of the first user, wherein the machine vision module is further configured to send to the second client device, via the data exchange management module, the head tracking metadata of the first client device and the identified graphical elements, and wherein the system enables exchanging video and audio data between users of the 3D virtual environment to provide video communications in the 3D virtual environment.

In some embodiments, the second client device is configured to receive the head tracking metadata to adjust the movement of the head of the user graphical representation of the first user; and render and present the modified presentation of the view of the second virtual camera including the user graphical representation of the first user and corresponding graphical elements.

In some embodiments, the key facial landmarks along with their coordinates are obtained and identified from color image frames of the first user or each user, which are sent by corresponding color cameras.

In some embodiments, the machine vision module is configured to associate the view of the first virtual camera corresponding to each user graphical representation to the coordinates of the key facial landmarks; track movement of the key facial landmarks in 6 degrees of freedom based on the movement of the head of the first user; and adjust the position and orientation of the first virtual camera based on the tracked movement of the key facial landmarks. The machine vision module may be further configured to dynamically select the elements of the virtual environment based on the adjusted position of the virtual camera; and present the selected elements of the virtual environment to the corresponding client device. In further embodiments, the machine vision module implements threshold values for one or more of the degrees of freedom to limit the adjustments in the position and orientation of the virtual camera. In yet further embodiments, the machine vision module implements the threshold values such that the movement of the head in each of the degrees of freedom results in a corresponding change of the virtual camera only after reaching the threshold value. In yet further embodiments, the machine vision module implements the threshold values such that the movement of the virtual camera associated with the movement of the head in each of the degrees of freedom is stopped after reaching the threshold value. In yet further embodiments, the machine vision module implements a multiplier value for one or more of the degrees of freedom which, when applied to movement of the virtual camera, results in an increased movement of the virtual camera with respect to each movement of the head. In yet further embodiments, the 3D virtual environment includes positions for the user graphical representations and their corresponding virtual cameras arranged in a geometry, and the adjustments of the position and orientation of the virtual cameras are controlled based on a horizontal rotation of the key facial landmarks so that the virtual cameras are moved on a predetermined path arranged in the geometry.

In one embodiment, the data management system is implemented via a hybrid system architecture comprising: a client-server side comprising web or application servers, wherein the web or application servers are configured to receive client requests employing secure communication protocols and process the client requests by requesting micro-services or data corresponding to the requests from a database; and a peer-to-peer (P2P) side comprising a P2P communication protocol enabling real-time communication between client devices and a rendering engine configured to enable the client devices to perform real-time 3D rendering of a live session in the 3D virtual environment.

In another aspect of the current disclosure, a non-transitory computer-readable medium is provided having stored thereon instructions configured to cause at least one server computer comprising a processor and memory to perform steps of herein described methods.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages of the present invention will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

Figure 1:
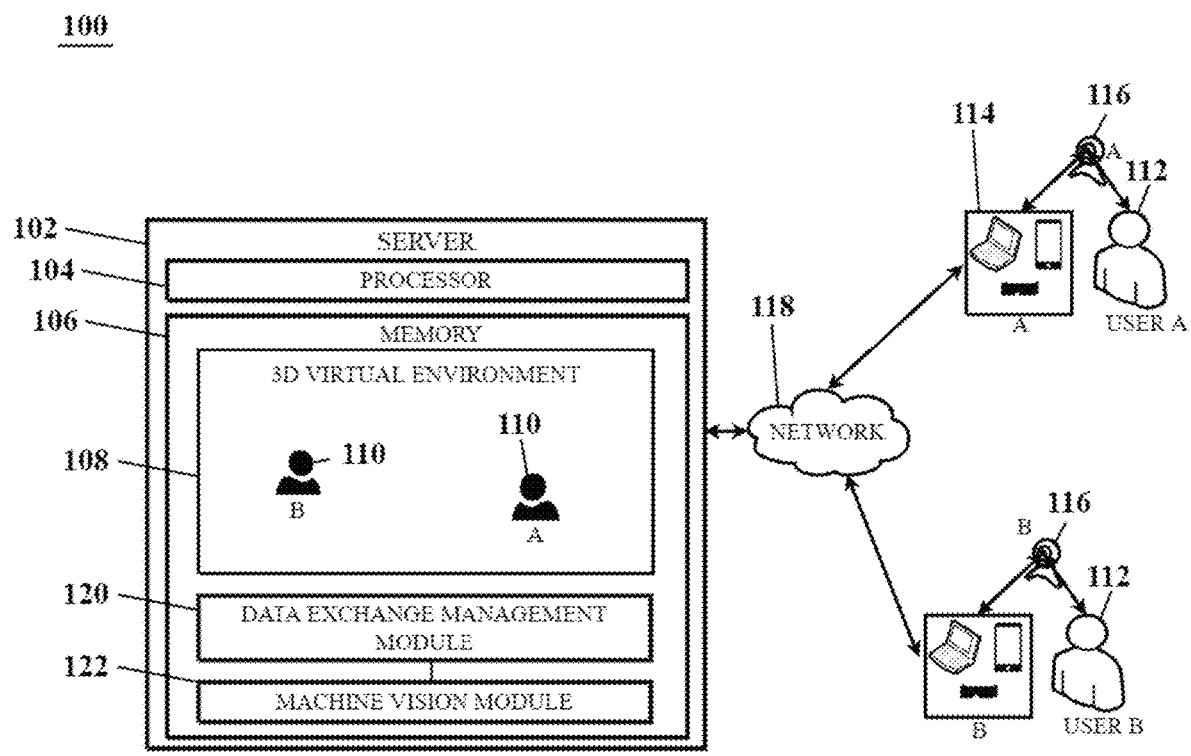
FIG. 1 depicts a schematic representation of a system enabling head-tracking-based media selection for video communications in virtual environments, according to an embodiment.

In the following description, reference is made to drawings which show by way of illustration various embodiments. Also, various embodiments will be described below by referring to several examples. It is to be understood that the embodiments may include changes in design and structure without departing from the scope of the claimed subject matter.

Systems and methods of the current disclosure provide improved media selection and presentation thereof in a virtual environment enabling video communications. More specifically, the systems and methods of the current disclosure enable head-tracking-based media selection for video communications. The virtual environment of the current disclosure enables real-time multi-user collaborations and interactions similar to those available in real life, which may be used for meetings, working, education, or other contexts. The virtual environment may be a 3D virtual environment comprising an arrangement and visual appearance, which may be customized by the users depending on their preferences or needs. The users may access the virtual environment through a graphical representation that may be inserted into the virtual environment and graphically combined with the 3D virtual environment.

The media selection and presentation thereof in a virtual environment implements head-tracking techniques that track key facial landmarks of the user, which are associated with a view from a virtual camera representing the view from the perspective of a user graphical representation. The virtual camera is thus adjusted based on the movement of the user's head and the media to be selected and presented to the user is also accordingly selected. The movements of the users' heads tracked through the head tracking algorithms generate metadata that is also retrieved by the system to update the user graphical representation's appearance to other users, providing a realistic and enhanced user experience.

The user graphical representation may be, e.g., a user 3D virtual cutout constructed from a user-uploaded or third-party-source photo with a removed background, or a user real-time 3D virtual cutout, or a video with removed background, or video without removed background. In some embodiments, the type of user graphical representation may be switched from one type to another, as desired by the user. The user graphical representations may be supplemented with additional features such as user status providing further details about the current availability or other data relevant to other users. In some embodiments, interactions such as conversation and collaboration between users in the virtual environments along with interactions with objects within the virtual environment are enabled.

Enabling virtual presence and realistic interactions and collaborations between users in such virtual environments may increase realism of remote activity. The systems and methods of the current disclosure further enable the access of the various virtual environments on client devices such as mobile devices or computers, without the need of more costly immersive devices such as extended reality head-mounted displays or costly novel system infrastructures.

In embodiments of the current disclosure, the adjustments of the virtual camera may be customized to provide a plurality of options that can enable a variety of effects, expanding the range of experiences in the virtual environment. The customizations of the adjustments can enable associating a virtual camera axis to specific head movements of the user. In one example, a back and forth movement from the head can be associated with the z-axis of the virtual camera to result in corresponding zoom-in and zoom-out effects. In another example, a lateral movement of the head of a user results in a movement of his or her user graphical representation and corresponding virtual camera on a virtual camera path established on a geometry, enabling the user to move within the virtual environment through the movements of his or her head along that path while still having the ability to type or do work with his or her hands. In another example, the adjustments of the virtual camera enable applying inverse values so that the movement of the head results in a reversed direction of the movement of the virtual camera. In another example, the adjustments of the virtual camera can use threshold values that control the beginning and end of the movement of the virtual camera. In another example, the adjustments of the virtual camera can use different multipliers to each axis or to each degree of freedom to enable different types of effects. The customization of the adjustments of the virtual camera can thus be well suited to the ergonomics of a meeting to enable users to use more body parts (head and hands) simultaneously while enabling different virtual camera movements and effects.

Client or peer devices of the current disclosure may comprise, for example, computers, headsets, mobile phones, glasses, transparent screens, tablets and generally input devices with cameras built-in or which may connect to cameras and receive data feed from said cameras.

Systems and methods of the current disclosure may employ a plurality of system architectures that enable the exchange of data either directly between peers or through the use of servers. One such architecture is a hybrid system architecture described below.

FIG. 1 depicts a schematic representation of a system 100 enabling head-tracking-based media selection for video communications in virtual environments, according to an embodiment. In some embodiments, a server computer selects the media to be delivered to a user device based on the user's view, for presentation on the device, effectively updating the user's view based on the movement of the user's head.

In the example shown in FIG. 1, system 100 of the current disclosure comprises one or more cloud server computers 102 comprising at least one processor 104 and memory 106 storing data and instructions implementing at least one virtual environment 108. The one or more cloud server computers 102 are configured to insert a user graphical representation 110 generated from a live data feed of a user 112 of a client device 114 obtained by a color camera 116 at a three-dimensional coordinate position of the at least one virtual environment 108, update the user graphical representation 110 in the at least one virtual environment 108, and enable real-time multi-user collaboration, communication and interactions in the virtual environment 108. In described embodiments, inserting a user graphical representation into a virtual environment 108 involves graphically combining the user graphical representation 110 in the virtual environment such that the user graphical representation 110 appears in the virtual environment 108 (e.g., at a specified 3D coordinate position). Each user graphical representation 110 comprises a virtual camera comprising a view of the virtual environment 108 from the perspective of the user graphical representation 110, which may be displayed through of the corresponding client devices 114. The one or more client devices 114 communicatively connect to the one or more cloud server computers 102 and at least one camera 116 via a network 118. The updated virtual environment is served to the client device by direct P2P communication or indirectly through the use of one or more cloud servers 102.

In FIG. 1, two users 112 (e.g., users A and B, respectively) are accessing virtual environment 108 and are interacting with elements therein and with each other through their corresponding user graphical representations 110 (e.g., user graphical representations A and B, respectively) accessed through corresponding client devices 114 (client devices A and B, respectively). Although only two users 112, client devices 114 and user graphical representations 110 are depicted in FIG. 1, the system 100 may enable more than two users 112 interacting with each other through their corresponding graphical representations 110 via corresponding client devices 114, as described in greater detail below.

FIG. 1 further comprises a data exchange management module 120 and a machine vision module 122. A module in the current disclosure refers to a logical sub-set of functionality provided by the system 100 enabling head-tracking-based media selection for video communications in virtual environments, which can be implemented in the form of a computer program stored in memory 106, may be executed by the at least one processor 104 and may alternatively comprise corresponding hardware elements (e.g., computer circuitry, sensors, etc.) to enable such a functionality, as needed. The system 100 is not limited to the presented modules and more or fewer modules may be included without departing from the scope of the current disclosure.

A plurality of multimedia streams are generated from within the virtual environment 108 comprising multimedia streams obtained by cameras 116 obtaining live feed data from the one or more users 112 and graphical elements from within the virtual environment 108. Thus, the data exchange management module 120 manages the exchange of the media streams, including video and audio data, between users of the 3D virtual environment 108 to enable video communications in the 3D virtual environment 108, as well as head tracking metadata of each of the users, as will be explained in more detail below. Such a data exchange occurs between client devices 114 connected to the server 102 via network 118. In some embodiments, the data exchange management module is configured to perform a plurality of operations, comprising analyzing and processing incoming data comprising the multimedia streams from the client devices 114 including graphical elements from within the 3D virtual environment 108, and adapting outbound multimedia streams. In an embodiment, this includes assessing and optimizing the forwarding of the outbound multimedia streams based on the incoming data received from the plurality of client devices 114. The outbound multimedia streams are adapted for the individual client devices 114 based on the incoming data, e.g., user priority data and spatial orientation data including headtracking metadata that describes spatial relationships between, e.g., corresponding user graphical representations 110 and sources of the incoming multimedia streams within the at least one 3D virtual environment 108. In an embodiment, the incoming data is associated with the spatial relationship between the one or more user graphical representations and at least one element of the at least one 3D virtual environment 108.

The machine vision module 122 is configured to perform machine vision operations on the data received from the data exchange management module 120. In the example of FIG. 1, the machine vision module 122 obtains color image frames of user A from the color camera A through the data exchange management module 120; identifies key facial landmarks and their coordinates from the color image frames; associates the view of the virtual camera corresponding to the user graphical representation A to the coordinates of the identified key facial landmarks; tracks movement of the key facial landmarks based on the movement of the head of user A; adjusts the position and orientation of the virtual camera based on the tracked movement of the key facial landmarks; dynamically selects the elements of the virtual environment 108 (e.g., user graphical representation B and/or other graphical elements within the field of view of user graphical representation A) based on the adjusted position of the virtual camera; and presents the selected elements of the virtual environment 108 to user A via client device A. Therefore, user A can move his or her head in real life resulting in a corresponding movement and adjustment of the virtual camera associated with user A, providing for a realistic user experience. Movements of user A's head produce head tracking metadata that is sent via the data exchange management module 120 to other client devices 114 of other users 112 having corresponding user graphical representations 110 in the virtual environment 108.

In some embodiments, the data exchange management module 120 receives head tracking metadata of client device A that comprises head tracking information (e.g., 6 degrees of freedom head tracking information (i.e., 3 degrees of translation and 3 degrees of orientation)) generated in response to tracking movement of key facial landmarks. The head tracking metadata comprises the coordinates of the key facial landmarks identified by the machine vision module 122. The data exchange management module 120 then sends the head tracking metadata to the machine vision module 122, which identifies graphical elements within field of view of the user graphical representation B corresponding to client device B, wherein the identified graphical elements comprise user graphical representation A, and sends the identified graphical elements to the data exchange management module 120. Identification of the user graphical representations in the field of view is helpful for determining which user graphical representations are to be updated based on the head tracking metadata. The data exchange management module 120 then sends to client device B via network 118 (e.g., using appropriate video and audio channels), the data comprising the head tracking metadata of user graphical representation A. Then, client device B uses the head tracking metadata to adjust the movement of the head of user graphical representation A and renders and displays the modified presentation of the user graphical representation A and corresponding graphical elements.

It is possible to use head tracking to adjust the view of the user whose head is being tracked without sending that metadata to other client devices. A server can, for example, update the respective views of the 3D environment for observing users to reflect movements of the tracked user's head by updating positioning or orientation of the user's corresponding user graphical representation in those views, without providing the underlying head-tracking metadata to other client devices. However, in described embodiments sending the metadata to other client devices allows other users to see a correct facial or head orientation while also allowing those other client devices to know where the actual 3D points of the tracked user's face are, which can indicate where the tracked user's attention is, rather than simply reflecting where that user has chosen to point their virtual camera.

In some embodiments, the metadata is sent to a server or server system for relaying to one or more other client devices. The server or server system can be, e.g., a selective forwarding unit (SFU) or multi-point control unit (MCU). Alternatively, the metadata is sent directly to other client device(s) via a peer-to-peer (P2P) arrangement. In some embodiments, the approach for providing metadata to other client devices is chosen based on the situation, and this determination may be made by, e.g., the data exchange management module. This determination may depend on the number of users involved, with P2P being used for a small number of users (e.g., 10 or less), SFU being used for a larger number of users (e.g., 11 to 30), and MCU being used for a still larger number of users (e.g., over 30). In some embodiments, the number of users on which the determination is based corresponds to how many users are visible in a field of view, taking into account any occlusions. The determination of how to send metadata to other devices, or whether to send the metadata to other devices at all, may also be based on other factors such as distance to other user graphical representations. For example, if other user graphical representations are beyond a threshold distance from a user graphical representation corresponding to a user whose head movements are being tracked, client devices corresponding to those other user graphical representations may not receive metadata updates and may not be counted in determining how the metadata updates are to be provided to other client devices.

In some circumstances, it may be helpful to use a combined approach by sending metadata to other client devices using P2P channels, while also providing the metadata to a server. For example, a P2P may be used where efficiency or reduced latency is important, whereas if reliability is of greater importance and bandwidth permits, a redundant approach may be used, where a P2P approach is used and a server also receives and sends metadata to other client devices.

Although only two users are shown in FIG. 1, a 3D virtual environment 108 of the current disclosure may host tens if not hundreds of user graphical representations 108. For the sake of simplicity, two pluralities of users will be used to describe the process detailed above, e.g., a first and a second plurality of users. In such embodiments, the data exchange management module 120 receives head tracking metadata of a first plurality of user graphical representations 110 comprising 6 degrees of freedom head tracking information generated in response to tracking movement of key facial landmarks; sends the head tracking metadata to the machine vision module 122, which identifies graphical elements within field of view of a second plurality of user graphical representations 110 and sends the identified graphical elements to the data exchange management module 120. The data exchange management module 120 sends to the second plurality of client devices 114 via network 118 using appropriate video and audio channels, the data comprising the head tracking metadata of the first plurality of user graphical representations 110. Then, the second plurality of client devices 114 use the head tracking metadata to adjust the movement of the head of the identified user graphical representations of the first plurality of user graphical representations 110 and renders and displays the modified presentation of the identified first plurality of user graphical representation and corresponding graphical elements.

As in the example described above, tracking the movement of the key facial landmarks is performed in 6 degrees of freedom comprising 3 degrees in translation and 3 degrees in orientation, enabling corresponding adjustments in 6 degrees in the position and orientation of the virtual camera. In further embodiments, the machine vision module 122 implements threshold values to one or more of the degrees of freedom to limit the adjustments in the position and orientation of the virtual camera.

In one embodiment, the threshold values are implemented such that the movement of the head in each of the degrees of freedom results in a corresponding change of the virtual camera only after reaching the threshold value. For example, considering a threshold value of 2 degrees, if user A moves his or her head 1 degree to the right, the virtual camera of the corresponding user graphical representation A may not be adjusted, giving the ability to user A to concentrate in the meeting without the viewing perspective in the 3D virtual environment 108 being shifted by slight movements. Likewise, in this example, user A's head position and orientation from the perspective of user B is not to be modified.

In another embodiment, the threshold values are implemented such that the movement of the virtual camera associated with the movement of the head in each of the degrees of freedom is stopped after reaching the threshold value. For example, considering a threshold value of 30 degrees, if user A moves his or her head 31 degrees to the right, then the virtual camera of the corresponding user graphical representation A may not be adjusted, as the view from user A may already go beyond the screen displaying the 3D virtual environment 108. Likewise, in this example, user A's head position and orientation from the perspective of user B is not to be modified after going beyond the 30 degrees to the right.

In one embodiment, the system 100 implements a multiplier value to one or more of the degrees of freedom, resulting in an increased movement of the virtual camera with respect to each movement of the head. For example, considering a multiplier of 6, if user A moves his or her head 5 degrees to the right, then the virtual camera of the corresponding user graphical representation A moves his or her head 30 degrees to the right. In some embodiments, the multipliers are applied differently in each axis of the degrees of freedom. For example, the multipliers may be applied such that they provide an exaggerated input in the x axis and a less exaggerated input in the y axis, allowing slight head movements on the x axis to result in longer movements along the x axis in the virtual camera, and shorter movements along the y axis in the virtual camera.

In some embodiments, the system 100 enables the direction of the adjustments of the position and orientation of the virtual camera with respect to the tracked movement of the key facial landmarks to be inverted. For example, if user A rotates his or her head to the left, the corresponding virtual camera embodied by the user graphical representation A will have a corresponding movement to the right.

In some embodiments, the 3D virtual environment 108 includes positions for the user graphical representations and their corresponding virtual cameras arranged in a geometry. For example, the geometry may be a circular or an oval geometry. In this embodiment, the adjustments of the position and orientation of the virtual cameras of each user 112 are controlled based on a horizontal movement or rotation of the key facial landmarks of the users 112 so that the virtual cameras are moved on a predetermined path arranged in the geometry. In other words, as a user 112 moves his or her head left or right, the horizontal movement of the head is associated with the horizontal movement of the virtual camera along the predetermined path. As such, while the user 112 turns his or her head to the left or right, the movement of the virtual camera may continuously rotate along the path of the geometry until the user moves his or her head back to the central position. This may enable the user 112 the freedom to use his or her hands to key in content, click on elements or user graphical representations in the virtual world, or do any type of work that can require the hands while the virtual camera moves in the horizontal plane to a desired position. In some embodiments, the client devices 114 may be one or more of mobile devices, personal computers, game consoles, media centers, and head-mounted displays, amongst others. The cameras 116 may be one or more of a 2D or 3D camera, 360 degree camera, web-camera, RGBD camera, CCTV camera, professional camera, mobile phone camera, depth camera (e.g., LIDAR), or a light-field camera, amongst others.

In some embodiments, a virtual environment 108 refers to a virtual construct (e.g., a virtual model) designed through any suitable 3D modelling technique through computer assisted drawing (CAD) methods. In further embodiments, the virtual environment 108 refers to a virtual construct that is scanned from a real construct (e.g., a physical room) through any suitable scanning tools, comprising image-scanning pipelines input through a variety of photo, video, depth measurements, and/or simultaneous location and mapping (SLAM) scanning in order to generate the virtual environment 108. For example, radar-imaging, such as synthetic-aperture radars, real-aperture radars, Light Detection and Ranging (LIDAR), inverse aperture radars, monopulse radars, and other types of imaging techniques may be used to map and model real-world constructs and turn them into a virtual environment 108. In other embodiments, the virtual environment 108 is a virtual construct that is modelled after a real construct (e.g., a room, building or facility in the real world).

In some embodiments, the client devices 114 and at least one cloud server computer 102 connect through a wired or wireless network. In some embodiments, the network may include millimeter-wave (mmW) or combinations of mmW and sub 6 GHz communication systems, such as 5th generation wireless systems communication (5G). In other embodiments, the system may connect through wireless local area networking (Wi-Fi). In other embodiments, the system may communicatively connect through fourth generation wireless systems communication (4G), may be supported by 4G communication systems, or may include other wired or wireless communication systems.

In some embodiments, processing and rendering comprised in the generation, updating and insertion of the user graphical representation 110 into the selected virtual environment 108 and combination therewith is performed by at least one processor of the client device 114 upon receiving the live data feed of the user 112. The one or more cloud server computers 102 may receive the client-rendered user graphical representation 110, insert the client-rendered user graphical representation 110 into a three-dimensional coordinate of the virtual environment 108, combine the inserted user graphical representation 110 with the virtual environment 108 and then proceed to transmit the client-rendered user graphical representation 110 to receiving client devices 114. For example, as viewed in FIG. 1, client device A may receive the live data feed from the respective camera 116, may process and render the data from the live data feed 114, generating the user graphical representation A, and may then transmit the client-rendered user graphical representation A to the at least one cloud server computer 102, which may position the user graphical representation A in a three-dimensional coordinate of the virtual environment 108 before transmitting the user graphical representation A to client device B. A similar process applies to the client device B and the user graphical representation B from user B. Both user graphical representations A and B may thus view each other in the virtual environment A and interact.

In some embodiments, processing and rendering comprised in the generation, updating and insertion of the user graphical representation 110 and combination with the virtual environment 108 is performed by the at least one processor 104 of the one or more cloud server computers 102 upon the client device 114 sending the unprocessed live data feed 114 of the user 112. The one or more cloud server computers 102 thus receive the unprocessed live data feed 114 of the user 112 from the client device 114 and then generate, process and render from the unprocessed live data feed, a user graphical representation 110 that is positioned within a three-dimensional coordinate of the virtual environment 108 before transmitting the cloud-rendered user graphical representation within the virtual environment to other client devices 114. For example, as viewed in FIG. 1, client device A may receive the live data feed 114 from the respective camera 116 and may then transmit the unprocessed user live data feed 114 to the at least one cloud server computer 102, which may generate, process and render the user graphical representation A and position the user graphical representation A in a three-dimensional coordinate of the virtual environment 108 before transmitting the user graphical representation A to client device B. A similar process applies to the client device B and the user graphical representation B from user B. Both user graphical representations A and B may thus view each other in the virtual environment A and interact.

In some embodiments, the user graphical representation 110 is a user 3D virtual cutout constructed from a user-uploaded or third-party-source (e.g., from a social media website) photo, or a user real-time 3D virtual cutout comprising the real-time video stream of the user 112 with a removed background, or a video with removed background, or a video without removed background. In further embodiments, the client device 114 generates the user graphical representation 110 by processing and analyzing the live camera feed 114 of the user 112, generating animation data that is sent to other peer client devices 114 via a peer-to-peer (P2P) system architecture or a hybrid system architecture. The receiving peer client devices 114 use the animation data to locally construct and update the user graphical representation.

A user 3D virtual cutout may include a virtual replica of a user constructed from a user-uploaded or third-party-source 2D photo. In an embodiment, the user 3D virtual cutout is created via a 3D virtual reconstruction process through machine vision techniques using the user-uploaded or third-party-source 2D photo as input data, generating a 3D mesh or 3D point cloud of the user with removed background. In one embodiment, the user 3D virtual cutout may have static facial expressions. In another embodiment, the user 3D virtual cutout may comprise facial expressions updated through the camera feed. In yet another embodiment, the user 3D virtual cutout may comprise expressions that may be changed through buttons on the user graphical interface, such as buttons that permit the user 3D virtual cutout to smile, frown, be serious, and the like. In yet a further embodiment, the user 3D virtual cutout uses combinations of aforementioned techniques to display facial expressions. After generating the user 3D virtual cutout, the status and/or facial expressions of the user 3D virtual cutout may be continuously updated by, e.g., processing the camera feed from the user. However, if the camera is not turned on, the user 3D virtual cutout may still be visible to other users with an unavailable status and static facial expressions. For example, the user may be currently focused on a task and may not want to be disturbed (e.g., having a "do not disturb" or "busy" status), therefore having his or her camera off 3D face model reconstruction (e.g., 3D face fitting and texture fusion) techniques for the creation of the user 3D virtual cutout may be used so that the resulting user graphical representation is clearly recognizable as being the user.

A user real-time 3D virtual cutout may include a virtual replica of a user based on the real-time 2D or 3D live video stream data feed obtained from the camera and after having the user background removed. In an embodiment, the user real-time 3D virtual cutout is created via a 3D virtual reconstruction process through machine vision techniques using the user live data feed as input data by generating a 3D mesh or 3D point cloud of the user with removed background. For example, the user real-time 3D virtual cutout may be generated from 2D video from a camera (e.g., a webcam) that may be processed to create a holographic 3D mesh or 3D point cloud. In another example, the user real-time 3D virtual cutout may be generated from 3D video from depth cameras (e.g., LIDARs or any depth camera) that may be processed to create a holographic 3D mesh or 3D point cloud. Thus, the user real-time 3D virtual cutout represents the user graphically in three dimensions and in real time.

A video with removed background may include a video streamed to a client device, wherein a background removal process has been performed so that only the user may be visible and then displayed utilizing a polygonal structure on the receiving client device. Video without removed background may include a video streamed to a client device, wherein the video is faithfully representing the camera capture, so that the user and his or her background are visible and then displayed utilizing a polygonal structure on the receiving client device. The polygonal structure can be a quad structure or more complex 3D structures used as a virtual frame to support the video.

A video without removed background may include a video streamed to a client device, wherein the video is faithfully representing the camera capture, so that the user and his or her background are visible and then displayed utilizing a polygonal structure on the receiving client device. The polygonal structure can be a quad structure or more complex 3D structures used as a virtual frame to support the video.

In some embodiments, the data used as input data comprised in the live data feed and/or user-uploaded or third-party-source 2D photo comprises 2D or 3D image data, 3D geometries, video data, media data, audio data, textual data, haptic data, time data, 3D entities, 3D dynamic objects, textual data, time data, metadata, priority data, security data, positional data, lighting data, depth data, and infrared data, amongst others.

In some embodiments, the background removal process required to enable the user real-time 3D virtual cutout is performed through image segmentation and usage of deep neural networks, which may be enabled through implementation of instructions by the one or more processors of the client device 114 or the at least one cloud server computer 102. Image segmentation is a process of partitioning a digital image into multiple objects, which may help to locate objects and boundaries that can separate the foreground (e.g., the user real-time 3D virtual cutout) obtained from the live data feed 114 of the user 112 from the background. A sample image segmentation that may be used in embodiments of the current disclosure may comprise the Watershed transformation algorithm available, for example, from OpenCV.

A suitable process of image segmentation that may be used for background removal in the current disclosure uses artificial intelligence (AI) techniques such as computer vision to enable such a background removal, and may comprise instance segmentation and/or semantic segmentation. Instance segmentation gives each individual instance of one or more multiple object classes a distinct label. In some examples, instance segmentation is performed through Mask R-CNN, which detects objects in an image, such as from the user live data feed 114 while simultaneously generating a high-quality segmentation mask for each instance, in addition to adding a branch for predicting an object mask in parallel with the existing branch for bounding box recognition. The segmented masks created for the user and for the background are then extracted and the background may be removed. Semantic segmentation uses deep learning or deep neural networks (DNN) techniques, enabling an automated background removal process. Semantic segmentation partitions images into semantically meaningful parts by giving each pixel a class label from one or more categories, such as by color, texture and smoothness, depending on predefined rules. In some examples, semantic segmentation may utilize fully convolutional networks (FCN) trained end-to-end, pixels-to-pixels on semantic segmentation, as disclosed in the document "Fully Convolutional Networks for Semantic Segmentation," by Evan Shelhamer, Jonathan Long, and Trevor Darrell, in *IEEE Transactions on Pattern Analysis and Machine Intelligence*, Vol. 39, No. 4 (April 2017), which is incorporated herein by reference. After the aforementioned background removal process, a point cloud within the face and body boundary of the user may remain, which the one or more processors of the client device 114 or the at least one cloud server computer 102 may process to generate a 3D mesh or 3D point cloud of the user that may be used in the construction of the user real-time 3D virtual cutout. The user real-time 3D virtual cutout is then updated from the live data feed 114 from camera 116.

Figure 2A:
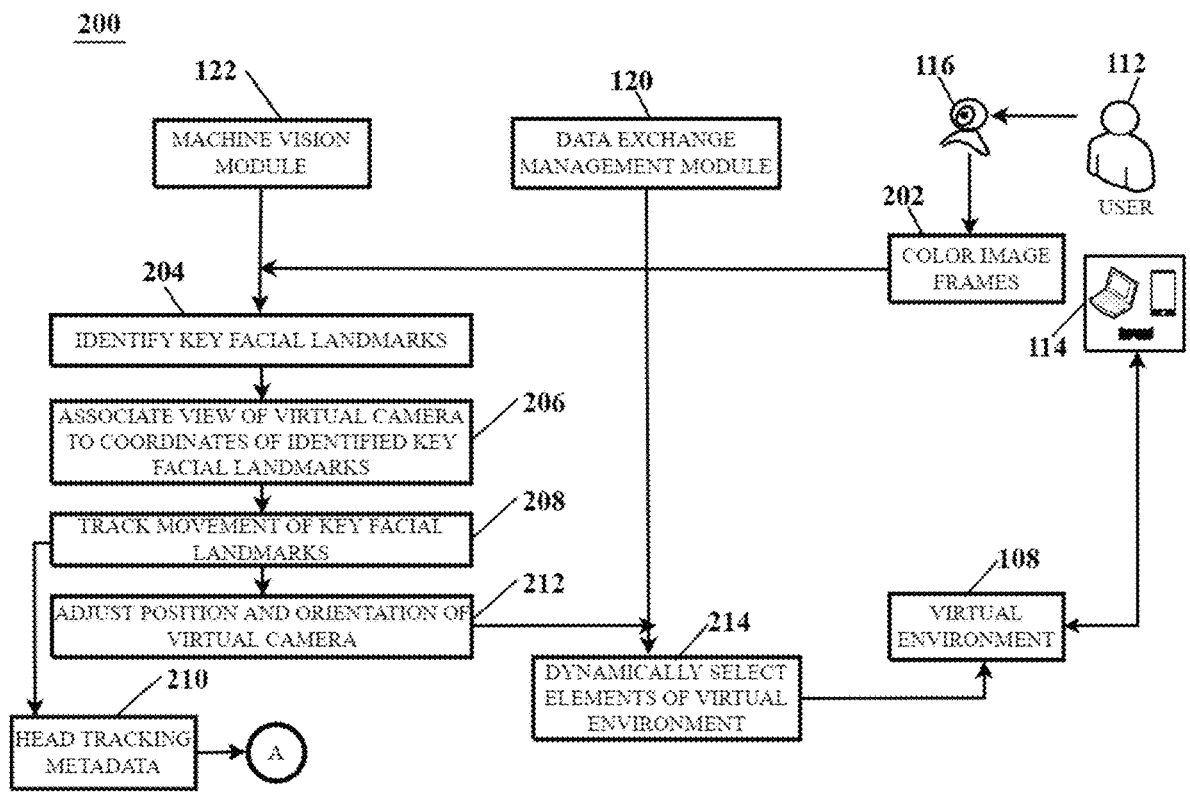
FIGS. 2A-2B depict schematic representations of a process flow of a method enabling head-tracking-based media selection for video communications in virtual environments, illustrating the interaction between elements of the system of FIG. 1.

FIG. 2A depicts a schematic representation of a process flow 200*a* of a method enabling head-tracking-based media selection for video communications in virtual environments, illustrating the interaction between elements of the system of FIG. 1. The same numerals will be used to represent elements that are common to those of FIG. 1.

In the process flow 200 a user 112 accesses a virtual environment 108 through his or her client device 114. Additionally, a camera 116 obtains color image frames 202 of the user 112, which are received by a data exchange management module 120 and sent to a machine vision module 122. The machine vision module 122 implements machine vision algorithms that enable performing a plurality of operations on the received image frames data. The machine vision module 122 identifies key facial landmarks and their coordinates from the color image frames through AI techniques, represented in FIG. 2 as block 204. The key facial landmark identification may use a suitable computer vision methods configured for face detection tasks, such as OpenCV face detection method, Seetaface face detection method, YouTu face detection method, Viola-Jones method, region-based convolutional neural networks (R-CNN), Single Shot Detector (SSD), Continuously Adapting Mean Shift algorithm (camshift algorithm), and the like. In one embodiment, the machine vision module 122 uses a trained variant of a BlazePose algorithm to perform the key facial landmark identification with high efficiency while reducing computing overhead. The BlazePose algorithm is a pose detection model that can compute three-dimensional coordinates of a plurality of skeleton keypoints from a human target. It includes two machine learning models, a detector and an estimator. The detector cuts the target from the image frame, while the estimator takes a 256×256 resolution image of the detected target as input and outputs the facial landmarks that are used for head tracking.

The key facial landmark identification detects features such as eyes, eyebrows, mouth, nose, and nostrils and their coordinates. Face detection algorithms need to be trained on large data sets incorporating hundreds of thousands of images. Although some sample face detection methods and algorithms are provided, the current disclosure is not limited to any of them, and any suitable face detection mechanism involving key facial landmark identification may be used.

In block 206, the machine vision module 122 associates the view of the virtual camera corresponding to the user graphical representation to the coordinates of the identified key facial landmarks. Then, in block 208, the machine vision module 122 tracks the movement of the key facial landmarks in 6 degrees of freedom (i.e., 3 degrees in translation and 3 degrees in orientation) based on the movement of the head of the user 112. Tracking of the movement of the key facial landmarks generates head tracking metadata 210. In block 212, the machine vision module 122 adjusts the position and orientation of the virtual camera based on the tracked movement of the key facial landmarks. Such movements may include movements of the head of the user in any of 6 degrees of freedom. Such adjustments may require rotating the virtual camera in any direction to show the changes from the perspective of the user graphical representation in the virtual environment 108.

In block 214, the adjusted position and orientation of the virtual camera is then sent to the data exchange management module 120, which dynamically selects the elements of the virtual environment 108 based on the adjustments of the position and orientation of the virtual camera of the user graphical representation. As long as there are movements of the key facial landmarks, the machine vision module 122 keeps tracking those movements, adjusting the position and orientation of the virtual camera, and sending the adjusted position and orientation of the virtual camera to the data exchange management module of blocks 208, 212 and 214. The data exchange management module 120 then sends the data to the virtual environment for presentation via a display of the client device 114, so that the user 112 may view the adjusted perspective from the field of view of his or her corresponding user graphical representation in the virtual environment 108. The head tracking metadata 210 goes to a second part of the process, as signaled by node A.

Figure 2B:
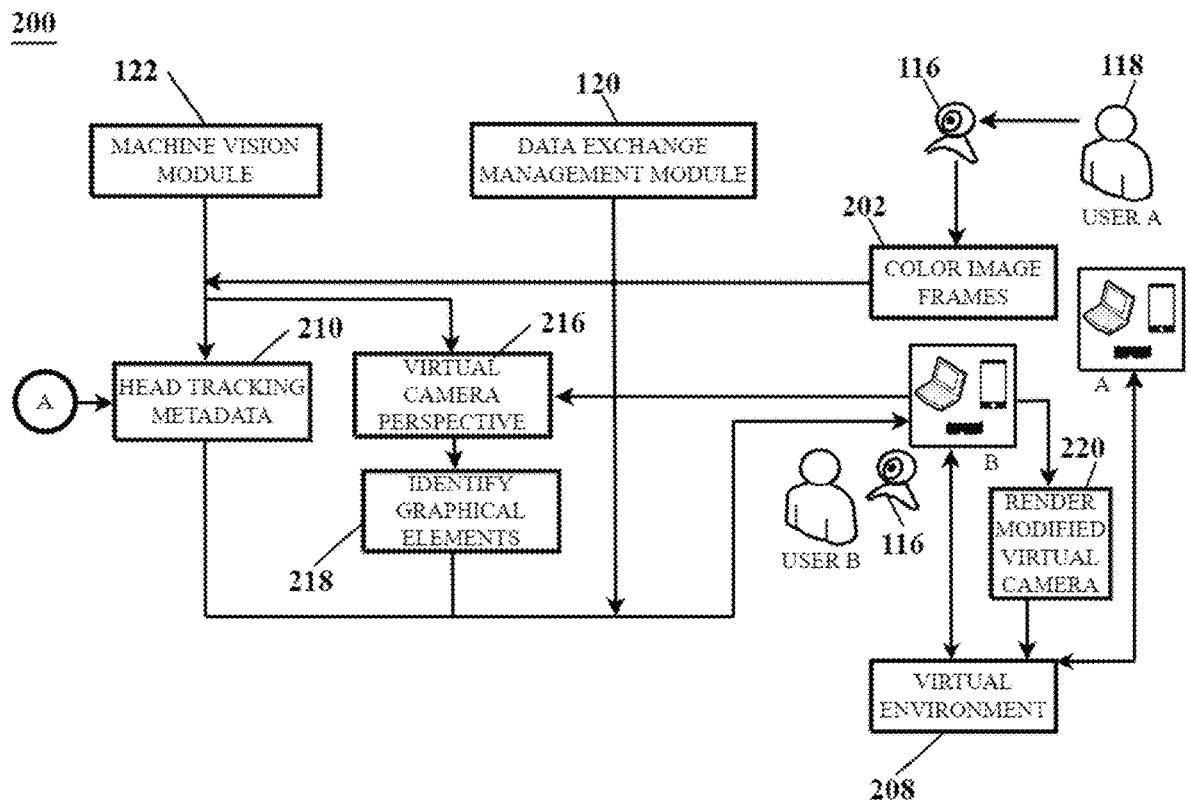

FIG. 2B illustrates a schematic representation of a process flow 200b of a method enabling head-tracking-based media selection for video communications in virtual environments, illustrating the interaction between elements of the system of FIG. 1. FIG. 2B includes similar elements to FIG. 2A including a user A accessing a virtual environment 208 through client device A and a camera A sending color image frames 202 to the machine vision module 122 through the data exchange management module 120. FIG. 2B also comprises a second user, user B, also accessing the virtual environment 208 through a client device B.

Starting at node A following the explanation of FIG. 2A, head tracking metadata 210 that comprises 6 degrees of freedom head tracking information including the coordinates of the key facial landmarks is generated when tracking the movement of the key facial landmarks of block 208. Client device B of user B also sends the virtual camera perspective 216 of the corresponding user graphical representation B (not shown) to the machine vision module 122 via the data exchange management module 120. In block 218, the machine vision module 122 identifies the graphical elements within the field of view of the virtual camera of user graphical representation B, comprising the user graphical representation A (not shown) of user A.

Then, the head tracking metadata 210 and identified graphical elements comprising the user graphical representation A are sent to the exchange management module 120, which receives them and sends them to the client device B. Client device B renders and presents the modified presentation of the virtual camera including the identified user graphical representation of the at least one first user and corresponding graphical elements, as viewed in block 220. The rendering may be done through local rendering, may use cloud-rendering techniques, or may use web-based supported rendering, such as through a suitable web-based rendering engine. One example of a suitable web-based rendering engine may be a WebGL rendering engine. The modified presentation thus comprises the modified head position and orientation of the user graphical representation A of user A as viewed within the virtual environment 208 to user B through client device B. Such a display of the movements of the heads of other participants through their corresponding user graphical representations in the virtual environment provides an improved user experience, increasing realism of interactions and presentation of the users graphical representations.

Figure 3:
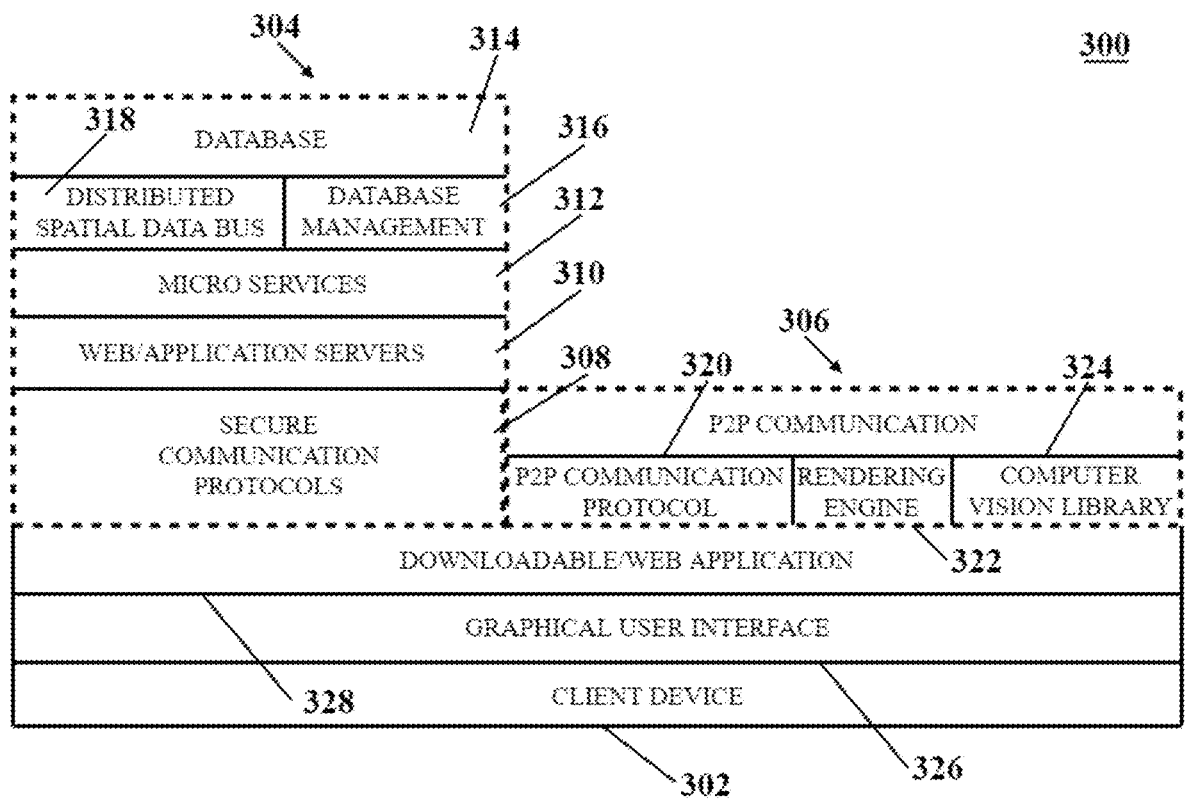
FIG. 3 depicts a schematic representation of a hybrid system architecture used by the system enabling head-tracking-based media selection for video communications in virtual environments, according to an embodiment.

FIG. 3 depicts a schematic representation of a hybrid system architecture 300 that can be used to enable the systems and methods of the current disclosure to provide dynamic load balancing in virtual environments, according to an embodiment.

A hybrid system architecture 300 is a hybrid model of communication for interacting with other client devices 302, comprising a client-server side 304 and a P2P side 306. Using such a hybrid model of communication may enable rapid P2P communications between users reducing latency problems while providing web services, data and resources to each session, enabling a plurality of interactions between users and with content in the virtual environment.

The client-server side employs secure communication protocols 308 to enable a secure end-to-end communication between the client device 302 and web/application servers 310 over a network. Sample suitable secure communication protocols 308 may comprise, for example, Datagram Transport Layer Security (DTLS) which is a secure user datagram protocol (UDP) in itself, Secure Realtime Transport Protocol (SRTP), Hypertext Transfer Protocol Secure (https://) and WebSocket Secure (wss://), which are compatible with each other and may provide full duplex authenticated application access, protection of privacy and integrity of exchanged data in transit. Suitable web/application servers 310 may comprise, for example, Jetty web application servers, which are Java HTTP web servers and Java Servlet containers, enabling machine to machine communications and a proper deployment of web application services. Other suitable web/application servers 310 may comprise Janus web servers, which implement the WebRTC protocol to set up media communication with a browser, exchanging JSON messages and relaying Real-time Transport Protocol/Real-time Transport Control Protocol (RTP/RTCP) and messages between browsers and the server-side application logic.

Although the web/application servers 310 are depicted as a single element in FIG. 3, those skilled in the art may appreciate that the web servers and application servers may be separate elements. For example, the web servers may be configured to receive client requests through the secure communication protocols 308 and route the requests to the application servers. The web/application servers 310 may thus receive the client requests using the secure communication protocols 308 and process the requests, which may comprise requesting one or more micro-services 312 (e.g., Java-based micro-services) and/or looking data up from a database 314 using a corresponding database management system 316. The web/application servers 310 may provide session management and numerous other services such as 3D content and application logic as well as state persistence of sessions (e.g., for persistently storing shared documents, synchronizing interactions and changes in the virtual environment, or persisting the visual state and modifications of a virtual environment). A suitable database management system 316 may be, for example, an object-relational mapping (ORM) database management system, which may be appropriate for database management using open-source and commercial (e.g., proprietary) services given ORM's capability for converting data between incompatible type systems using object-oriented programming languages. In further embodiments, a distributed spatial data bus 318 may further be utilized as a distributed message and resource distribution platform between micro-services and client devices by using a publish-subscribe model.

The P2P side 306 may use a suitable P2P communication protocol 320 enabling real-time communication between peer client devices 302 in the virtual environment through suitable application programming interfaces (APIs), enabling real-time interactions and synchronizations thereof, allowing for a multi-user collaborative environment. For example, through the P2P side 306, contributions of one or more users may be directly transmitted to other users, which may observe, in real-time, the changes performed. An example of a suitable P2P communication protocol 320 may be a Web Real-Time Communication (WebRTC) communication protocol, which is collection of standards, protocols, and JavaScript APIs, which, in combination, enable P2P audio, video, and data sharing between peer client devices 302. Client devices 302 in the P2P side 306 may perform real-time 3D rendering of the live session employing one or more rendering engines 322. An example of a suitable rendering engine 322 may be 3D engines based on WebGL, which is a JavaScript API for rendering 2D and 3D graphics within any compatible web browser without the use of plug-ins, allowing accelerated usage of physics and image processing and effects by one or more processors of the client device 302 (e.g., one or more graphic processing units (GPUs)). Furthermore, client devices 302 in the P2P side 306 may perform image and video-processing and machine-learning computer vision techniques through one or more suitable computer vision libraries 324. An example of a suitable computer vision library 324 may be OpenCV, which is a library of programming functions configured for real-time computer vision tasks.

The client devices may access both the client-server side 304 and a P2P side 306 of the hybrid system architecture 300 through a graphical user interface 326 available from downloadable or web applications 328.

FIGS. 4A-4E depict schematic representations of a virtual environment 400 using a head-tracking-based media selection of the current disclosure based on the description of FIGS. 1-2B, according to an embodiment.

Figure 4A:
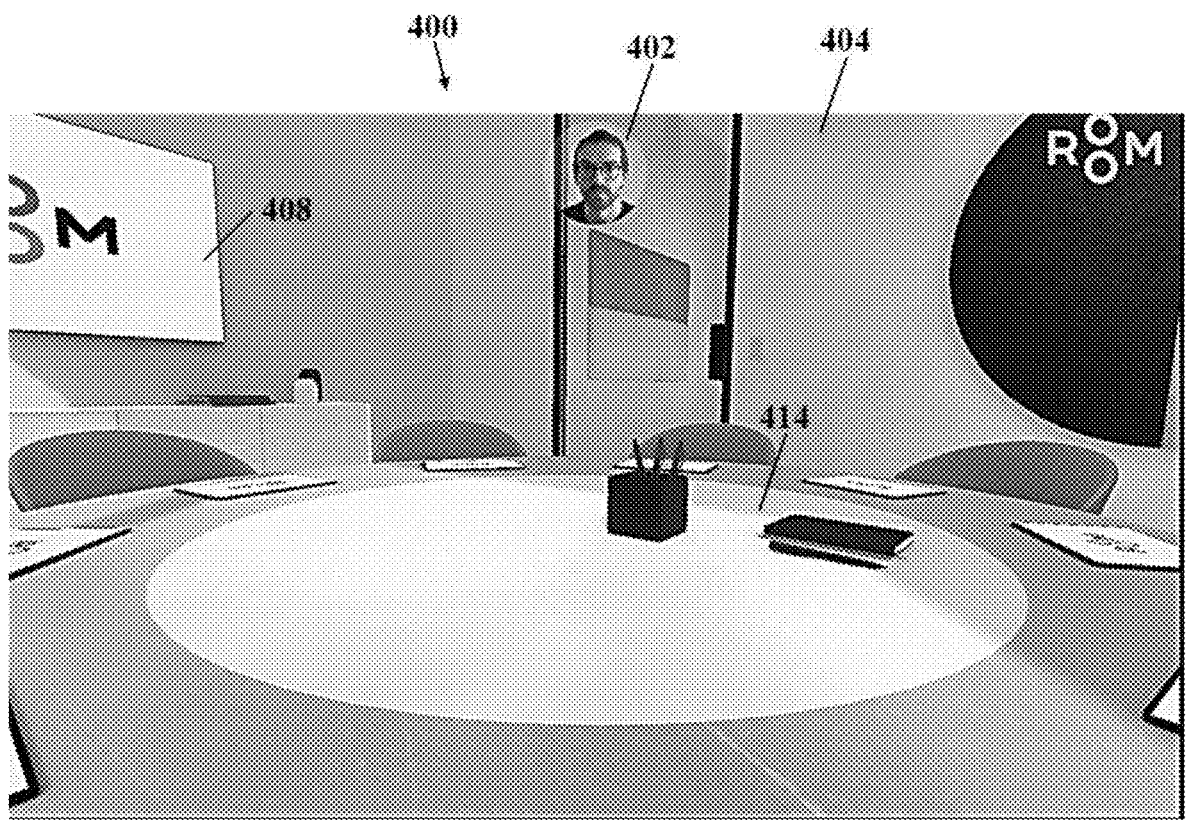
FIGS. 4A-4E depict schematic representations of a virtual environment using a head-tracking-based media selection of the current disclosure, according to an embodiment.

FIG. 4A shows a user 402 looking straight into a camera to show an associated straight-looking virtual camera 404. The virtual camera represents the actual field of view of the user within the virtual environment corresponding to the user's head position in real life.

Figure 4B:
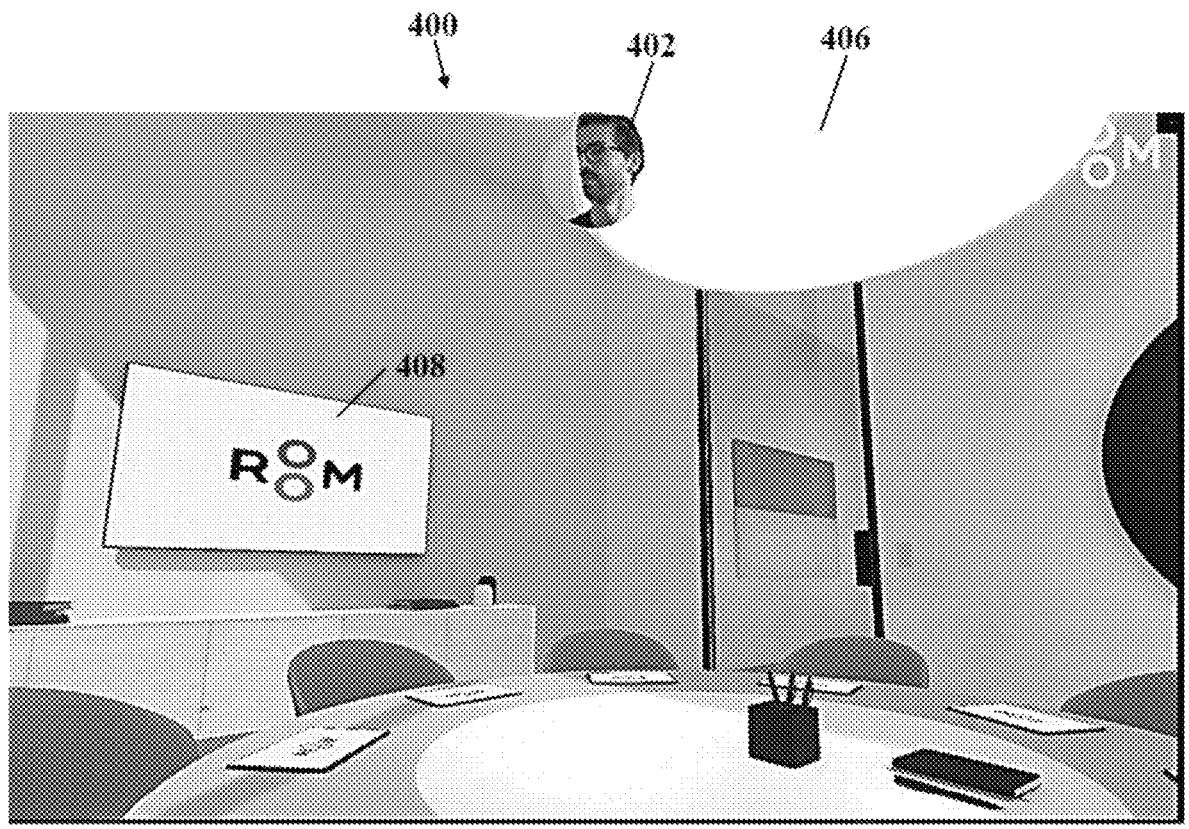

FIG. 4B shows a user 402 rotating his head to the left in front of the camera to show an associated left-looking virtual camera 406. In this case, the virtual camera of the user has been shifted to the left so that elements that used to be located on the left side have now shifted to the right to match the user's head movement. For example, making references to FIG. 4A, the sign 408 on the wall that says "ROOM" was cut out from the image as it was located in the far left corner. After the user 402 shifted his head to the left, the same sign can be seen fully as the left-looking virtual camera 406 now comprises the sign in its totality.

Figure 4C:
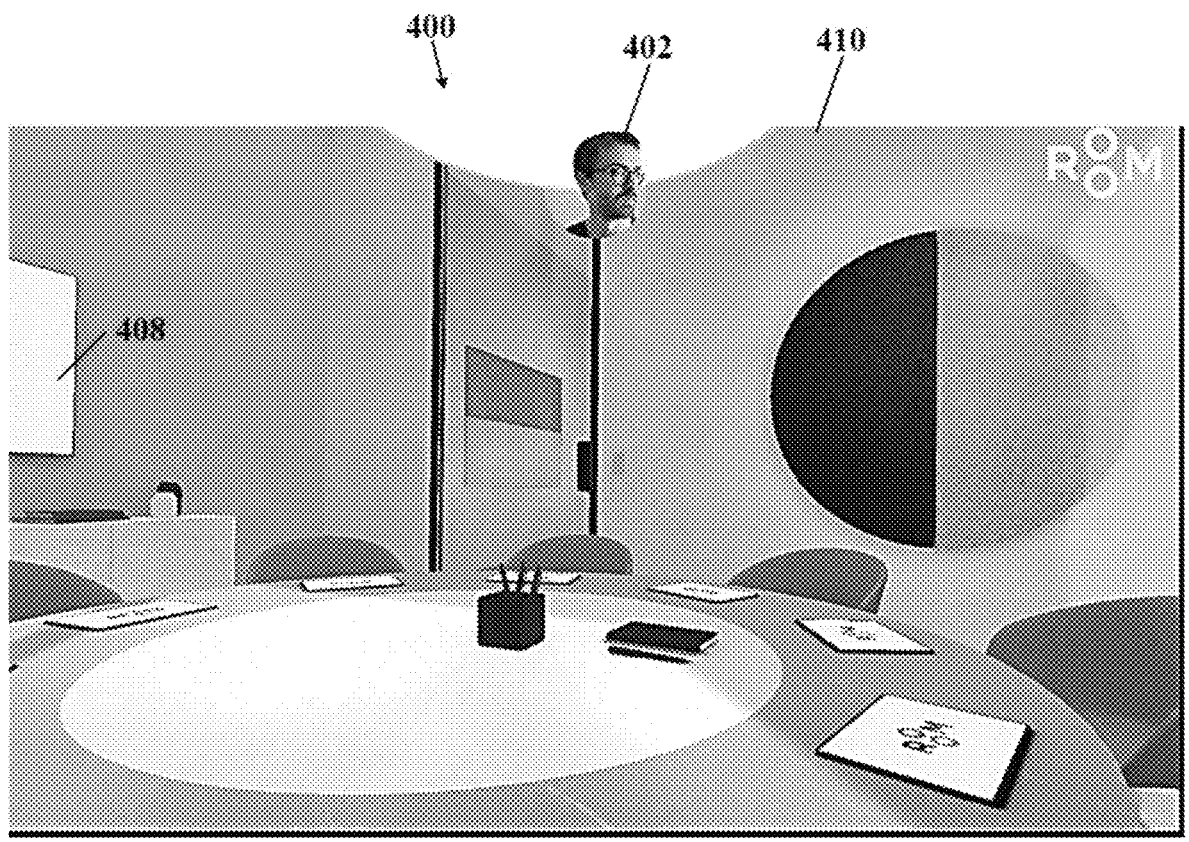

FIG. 4C shows a user 402 rotating his head to the right in front of the camera to show an associated right-looking virtual camera 410. In this case, the virtual camera 410 of the user 402 has been shifted to the right so that elements that used to be located on the left side have now shifted to the left to match the user's head movement. For example, making references to FIG. 4A, the sign 408 on the wall that says "ROOM" was cut out from the image as it was located in the far left corner. After the user 402 shifted his head to the right, none of the letters of the sign 408 can be visible, as the right-looking virtual camera 406 does not include the sign in its view.

Figure 4D:
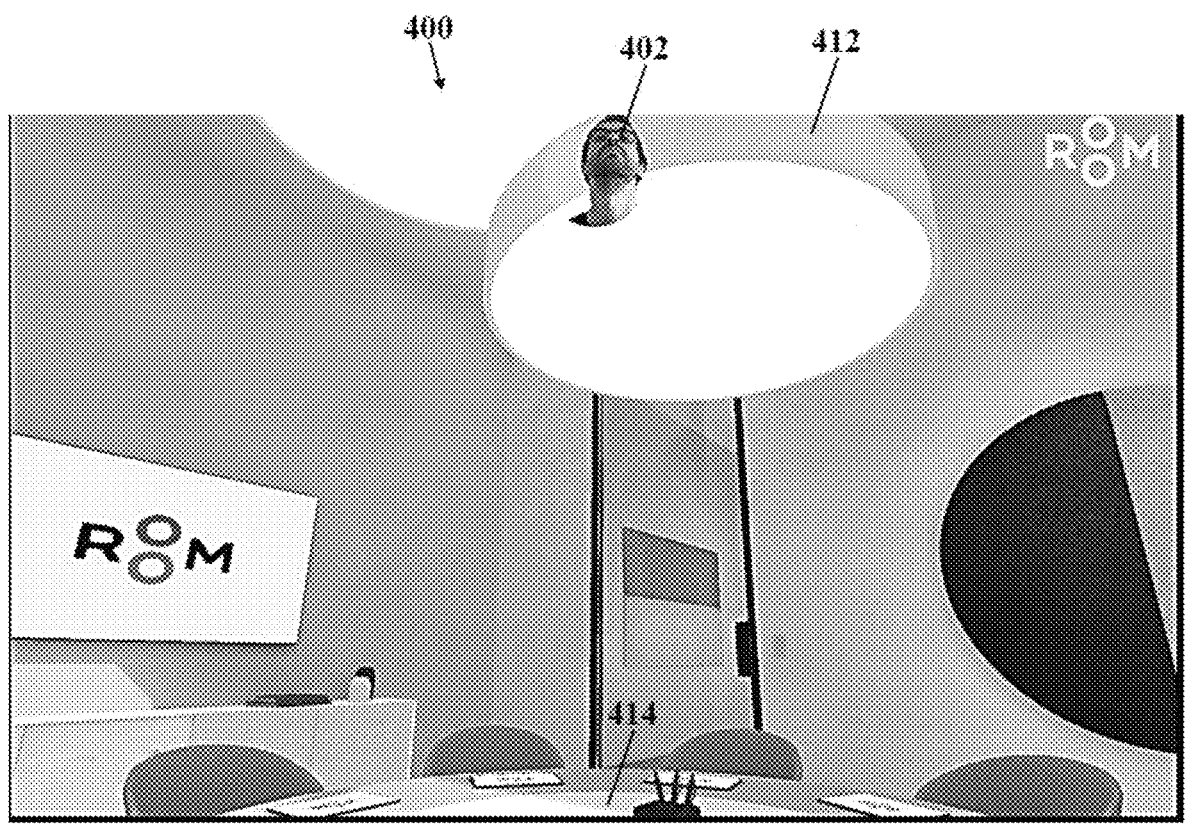

FIG. 4D shows a user 402 rotating his head upward in front of the camera to show an associated upward-looking virtual camera 412. In this case, the virtual camera 412 of the user 402 has been shifted upward so that elements that used to be located at the bottom of the perspective of the field of view of the virtual camera have now shifted downward to match the user's head movement. For example, making references to FIG. 4A, the center 414 of the table, which was fully visible when the user 402 was looking straight into the camera, was almost fully cut out from FIG. 4D after the user 402 shifted his head upward.

Figure 4E:
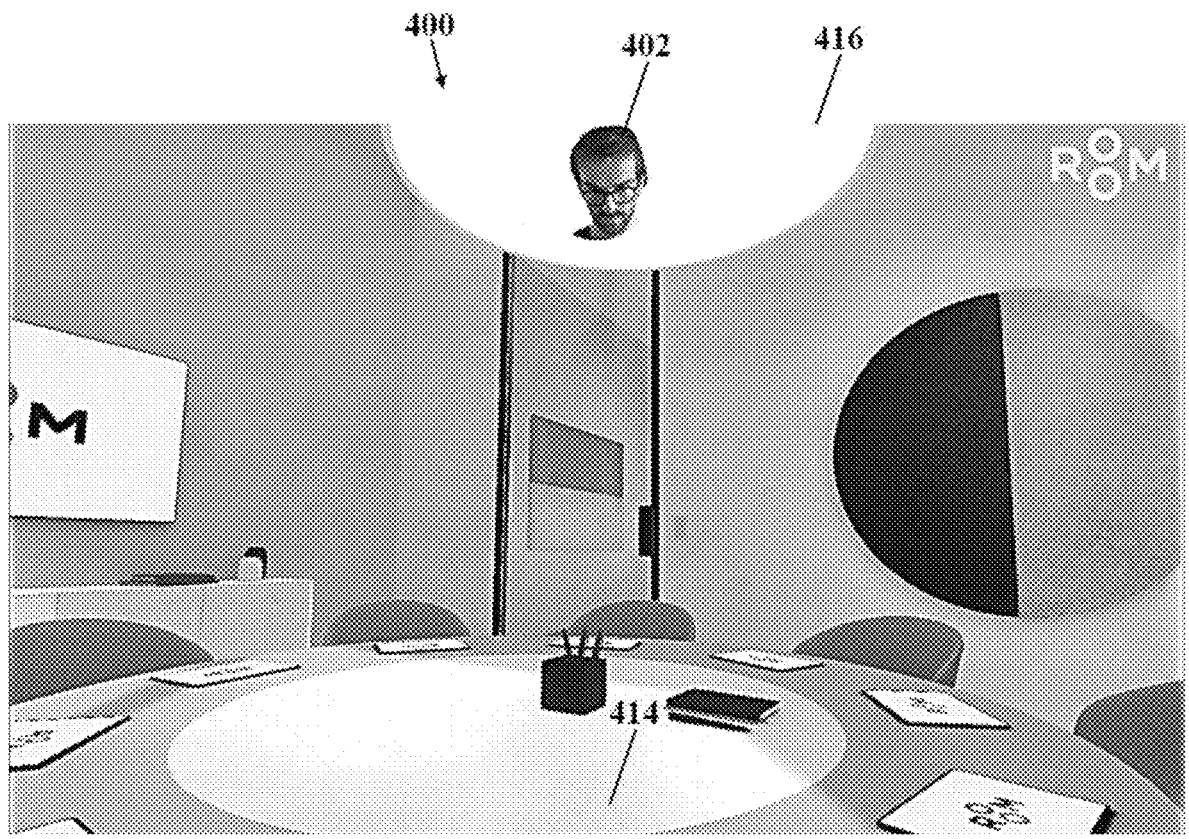

FIG. 4E shows a user 402 rotating his head downward in front of the camera to show an associated downward-looking virtual camera 416. In this case, the virtual camera 416 of the user 402 has been shifted downward so that elements that used to be located at the bottom of the perspective of the field of view of the virtual camera have now shifted upward to match the user's head movement. For example, the center 414 of the table, which was not visible when the user 402 was looking up into the camera in FIG. 4D, is now visible at the bottom of the image.

Figure 5A:
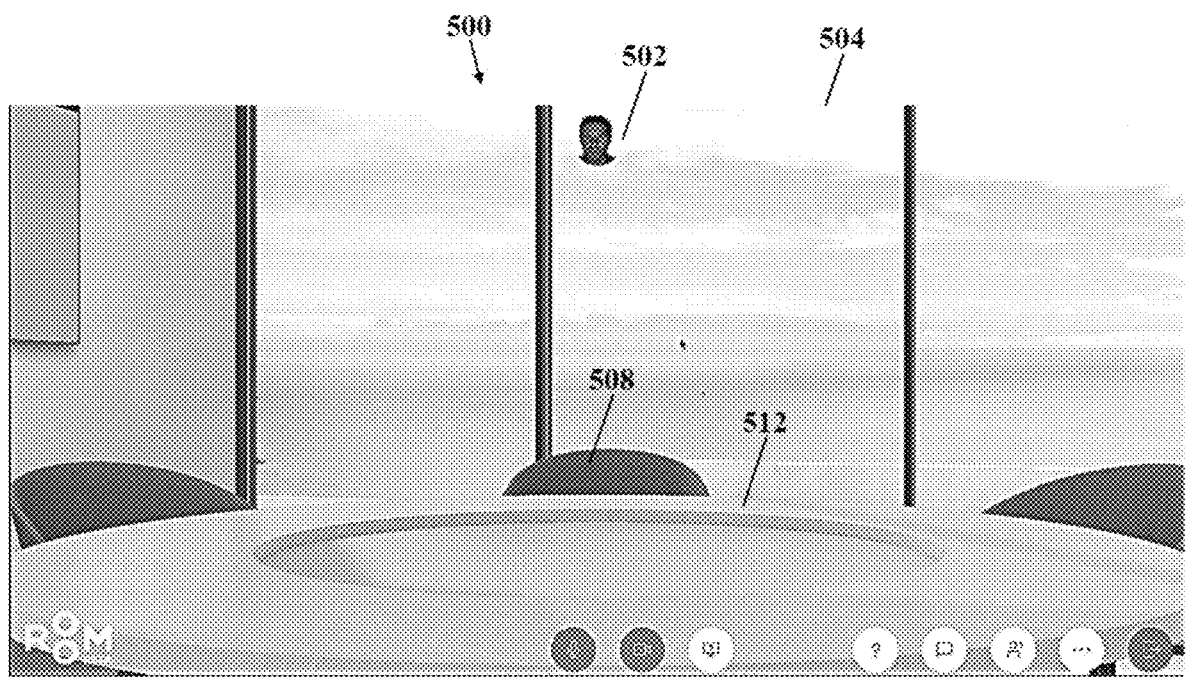
FIGS. 5A-5C depict schematic representations of a virtual environment using a head-tracking-based media selection of the current disclosure focusing on head-movements and corresponding virtual camera adjustments in the z-axis, enabling zoom-in and zoom-out functions.
Figure 5B:
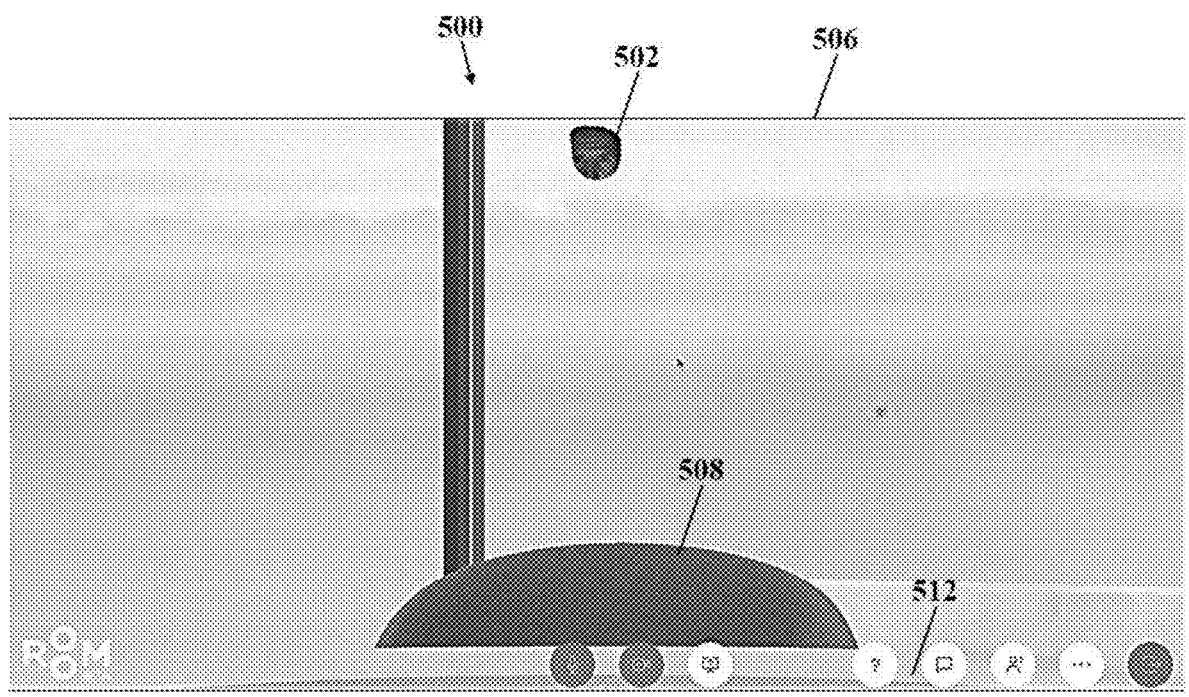
Figure 5C:
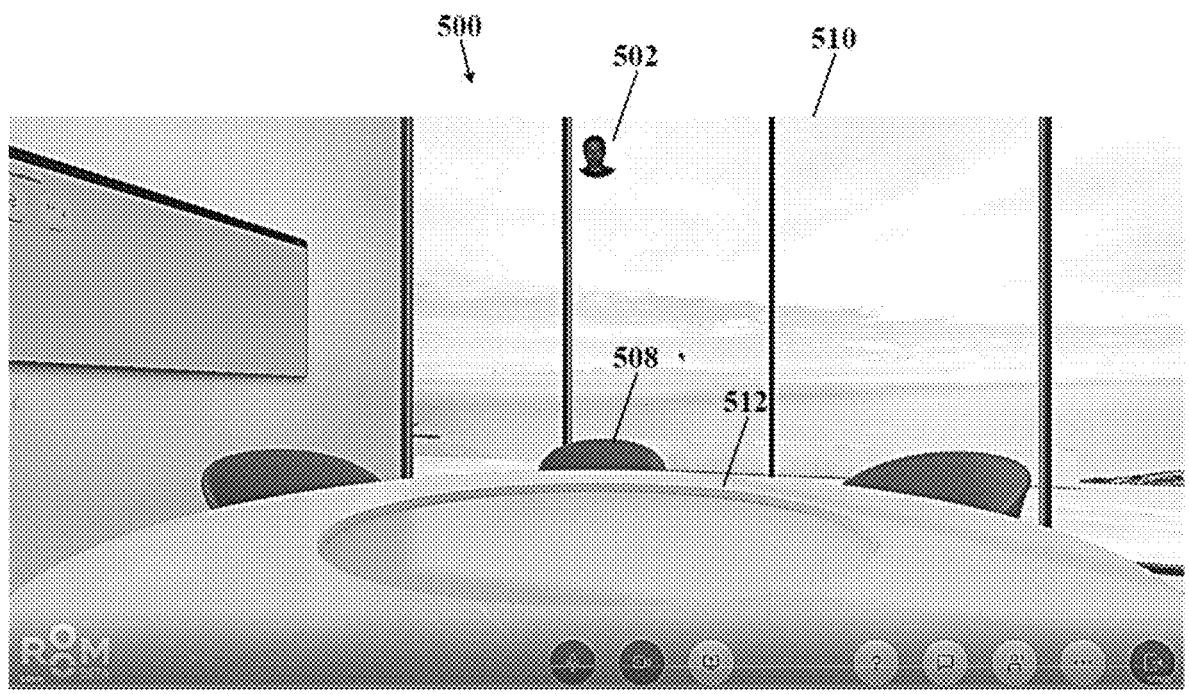

FIGS. 5A-5C depict schematic representations of a virtual environment 500 using a head-tracking-based media selection of the current disclosure based on the description of FIGS. 1-2B, focusing on head-movements and corresponding virtual camera adjustments in the z-axis, enabling zoom-in and zoom-out functions.

FIG. 5A shows a user 502 looking straight into a camera without any type of zooming function, showing an associated virtual camera 504. The virtual camera represents the actual field of view of the user within the virtual environment corresponding to the user's head position in real life.

FIG. 5B shows user 502 moving closer to the camera to show an associated zoomed-in virtual camera 506. In this case, the virtual camera 506 of the user 502 has zoomed in so that elements within the field of view of the virtual camera 506 look bigger to user 502 as compared to the virtual camera 504 of FIG. 5A. For example, making reference to FIGS. 5A and 5B, chair 508 looks bigger in FIG. 5B than in FIG. 5A.

FIG. 5C shows user 502 moving away from the camera to show an associated zoomed-out virtual camera 510. In this case, the virtual camera 510 of the user 502 has zoomed out so that elements within the field of view of the virtual camera 506 look smaller to user 502 as compared to the virtual camera 504 of FIG. 5A. For example, making reference to FIGS. 5A and 5C, chair 508 looks smaller in FIG. 5C than in FIG. 5A.

In the embodiments of FIGS. 5A-5C above, the head movements in the z-axis (forward and backward) are non-literally mapped to a zoom function of the camera 116 implementing a machine vision module 122 of the current disclosure as shown in FIG. 1, so that the tracked key facial landmarks control how close or far the virtual camera moves while achieving a desired effect. As referred to in this embodiment, "non-literally" means that there is a dissociation between the input head tracking data and the actual adjustments of the camera to achieve the desired effect. In one embodiment, the non-literal mapping is achieved by applying a dolly zoom effect, which is an in-camera effect that is achieved by zooming the virtual camera to adjust the angle of view while simultaneously the virtual camera dollies, or moves, toward or away from the elements in the virtual environment. For example, in the illustrations of FIGS. 5A-5C, the virtual camera is configured to keep the edge of the table 512 as constant focal plane, which may suit the ergonomics of a virtual meeting where the virtual camera has to remain relatively constant.

All embodiments depicted with reference to FIGS. 4A-5C may apply implement threshold values to each degree of freedom, multipliers and inverse movements to achieve desired effects with the purpose of increasing realism of the user experience and interactions in the virtual environment, as detailed in the description of FIG. 1.

Figure 6A:
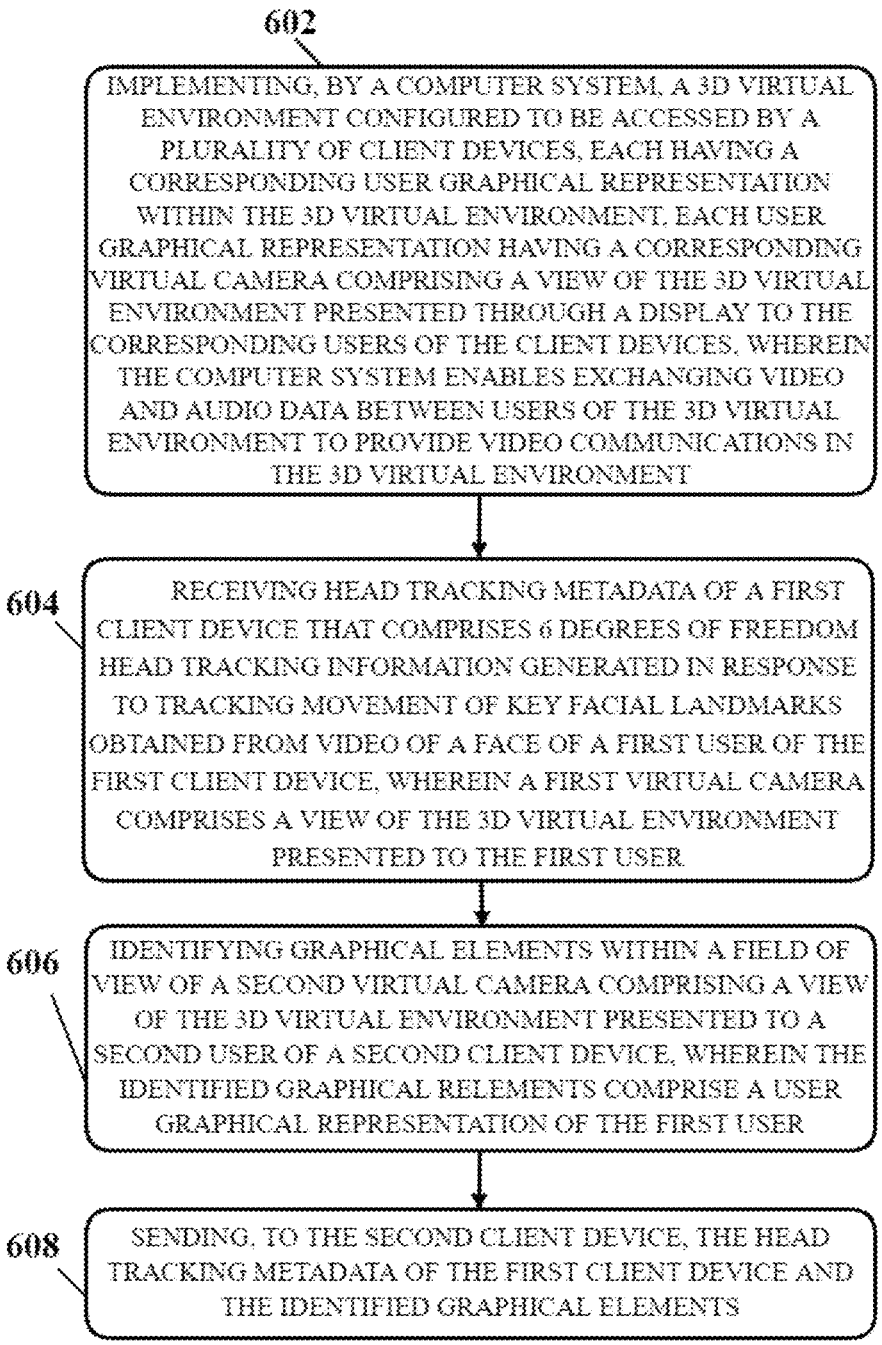
FIGS. 6A-6C depict a block diagram of a method enabling head-tracking-based media selection for video communications in virtual environments, according to an embodiment.
Figure 6B:
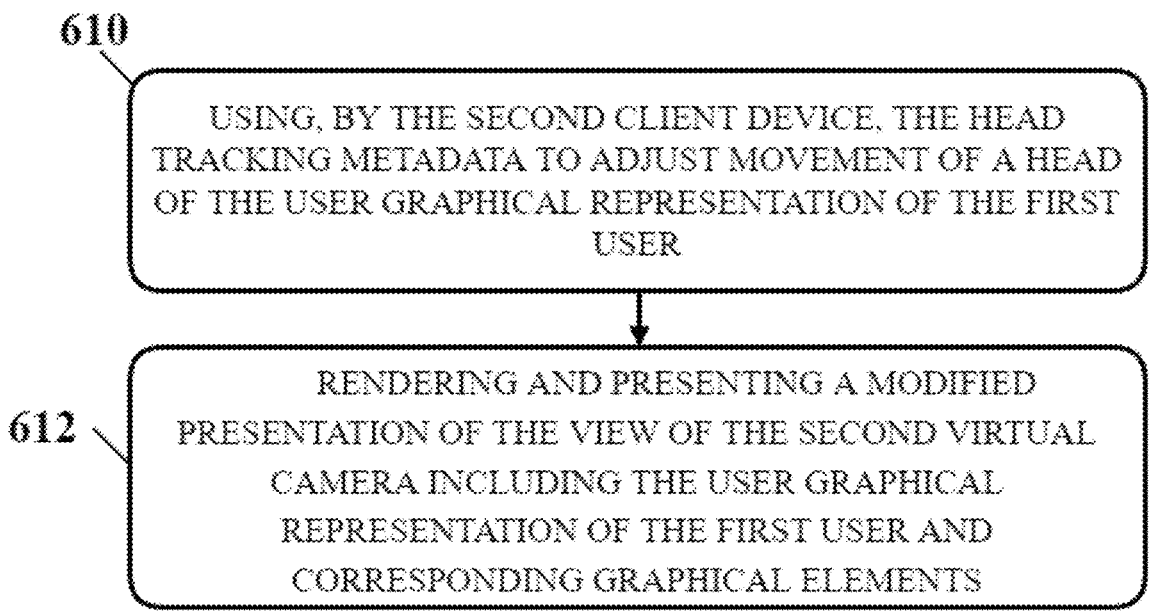
Figure 6C:
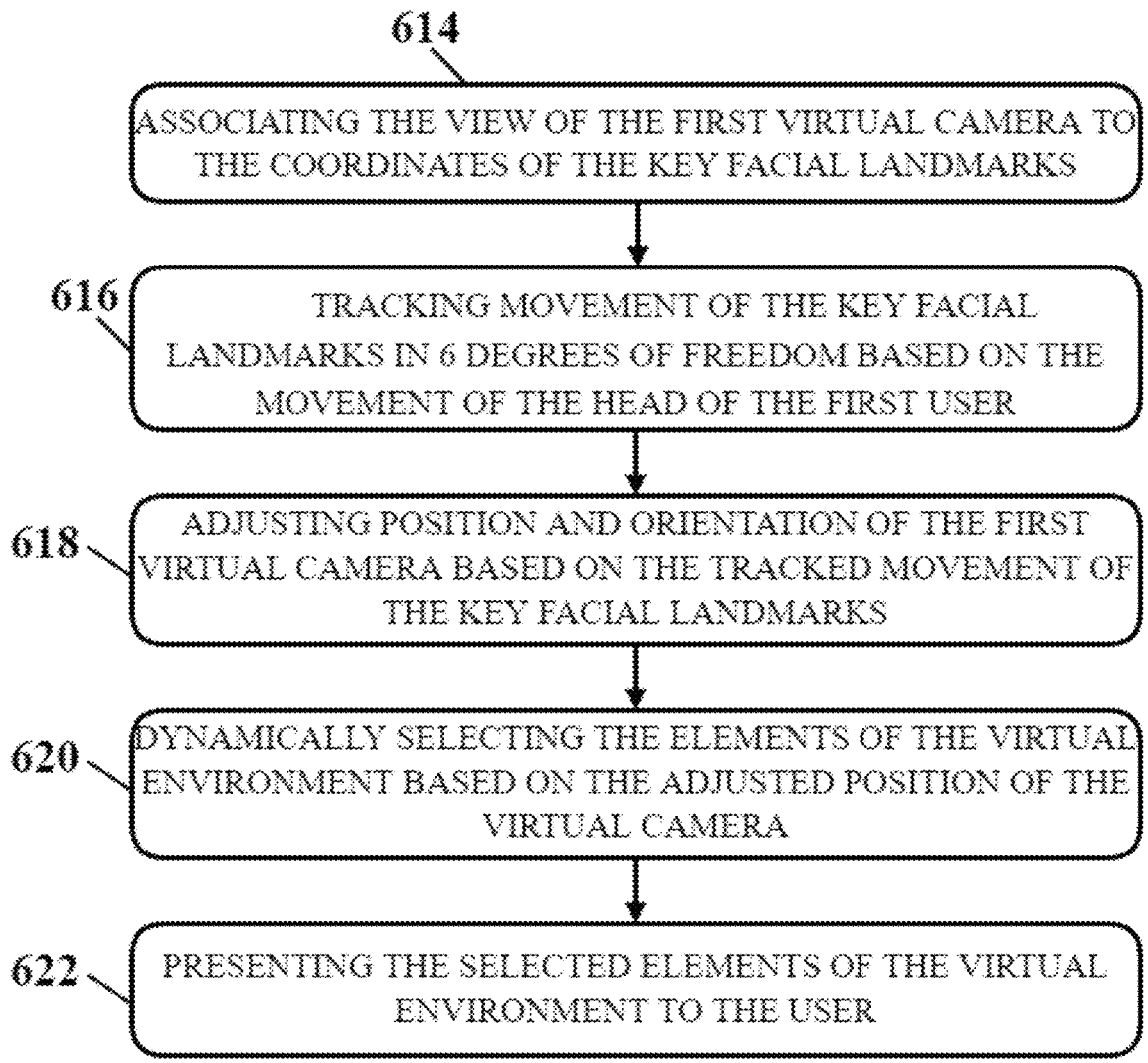

FIGS. 6A-6C depict block diagrams of methods 600a-600c enabling various embodiments of head-tracking-based media selection for video communications in virtual environments of the current disclosure. Methods 600a-600c may be implemented by a system such as system 100 as described with reference to FIG. 1, which may enable exchanging video and audio data between users of the 3D virtual environment to provide video communications in the 3D virtual environment.

FIG. 6A depicts a block diagram of method 600a enabling head-tracking-based media selection for video communications in virtual environments. Method 600a begins in step 602 by implementing a 3D virtual environment configured to be accessed by a plurality of client devices, each having a corresponding user graphical representation within the 3D virtual environment, and each user graphical representation having a corresponding virtual camera comprising a view of the 3D virtual environment presented through a display to the corresponding users of the client devices. The method 600a continues in step 604 by receiving head tracking metadata of a first client device that comprises 6 degrees of freedom head tracking information generated in response to tracking movement of key facial landmarks. Subsequently, in step 606, the method 600a proceeds by identifying graphical elements within a field of view of the virtual camera of at least a second client device, wherein the identified graphical elements comprise the user graphical representation of the first user. Then, the method 600a ends in step 608 by sending, to at least the second client device, the head tracking metadata of the first client device, which corresponds to the identified user graphical representation of the first user and the identified graphical elements.

FIG. 6B depicts a block diagram of a method 600b enabling head-tracking-based media selection for video communications in virtual environments, according to an embodiment. Method 600b begins in step 610 by using, by at least the second client device, the head tracking metadata of the first client device, which corresponds to the identified user graphical representations of the first user received in step 608 of method 600a to adjust the movement of the head of the identified user graphical representation of the first user. Method 600b ends in block 612 by rendering and presenting the modified presentation of the virtual camera of at least the second client device including the identified user graphical representation of the first user and corresponding graphical elements.

FIG. 6C depicts a block diagram of a method 600c enabling head-tracking-based media selection for video communications in virtual environments, according to an embodiment. Method 600c begins in step 614 by associating the view of the virtual camera corresponding to each user graphical representation to the coordinates of the key facial landmarks. The key facial landmarks along with their coordinates are obtained and identified from color image frames of each user sent by corresponding color cameras. Then, in step 616, method 600c proceeds by tracking movement of the key facial landmarks in 6 degrees of freedom based on the movement of the head of the user. In step 618, method 600c continues by adjusting the position and orientation of the virtual camera based on the tracked movement of the key facial landmarks, and then by dynamically selecting the elements of the virtual environment based on the adjusted position of the virtual camera, as seen in step 620. Finally, method 600c ends in step 622 by presenting the selected elements of the virtual environment to the user.

Computer-readable media having stored thereon instructions configured to cause one or more computers to perform any of the methods described herein are also described. As used herein, the term "computer readable medium" includes volatile and nonvolatile and removable and nonremovable media implemented in any method or technology capable of storing information, such as computer readable instructions, data structures, program modules, or other data. In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C #, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A method for video communications implemented by a computer system, the method comprising:
   implementing a 3D virtual environment configured to be accessed by a plurality of client devices, each having a corresponding user graphical representation within the 3D virtual environment, each user graphical representation having a corresponding virtual camera comprising a view of the 3D virtual environment presented through a display to the corresponding users of the client devices, wherein the computer system enables exchanging video and audio data between users of the 3D virtual environment to provide video communications in the 3D virtual environment;
   receiving head tracking metadata of a first client device that comprises 6 degrees of freedom head tracking information generated in response to tracking movement of key facial landmarks obtained from video of a face of a first user of the first client device, wherein a first virtual camera comprises a view of the 3D virtual environment presented to the first user;
   associating the view of the first virtual camera to the coordinates of the key facial landmarks;
   tracking movement of the key facial landmarks in the 6 degrees of freedom based on the movement of the head of the first user;
   adjusting the position and orientation of the first virtual camera based on the tracked movement of the key facial landmarks;
   identifying graphical elements within a field of view of a second virtual camera comprising a view of the 3D virtual environment presented to a second user of a second client device, wherein the identified graphical elements comprise a user graphical representation of the first user; and
   sending, to the second client device, the head tracking metadata of the first client device and the identified graphical elements.

2. The method of claim 1, comprising:
   using, by the second client device, the head tracking metadata to adjust movement of a head of the user graphical representation of the first user; and
   rendering and presenting a modified presentation of the view of the second virtual camera including the user graphical representation of the first user and corresponding graphical elements.

3. The method of claim 1, wherein threshold values for one or more of the degrees of freedom limit the adjustments in the position and orientation of the virtual camera.

4. The method of claim 3, wherein the movement of the head in each of the degrees of freedom results in a corresponding change of the virtual camera only after reaching the threshold value.

5. The method of claim 3, wherein the movement of the virtual camera associated with the movement of the head in each of the degrees of freedom is stopped after reaching the threshold value.

6. The method of claim 1, comprising applying a multiplier value to one or more of the degrees of freedom, resulting in an increased movement of the virtual camera with respect to each movement of the head.

7. The method of claim 1, comprising inverting the direction of the adjustments of the position and orientation of the virtual camera with respect to the tracked movements of the key facial landmarks.

8. The method of claim 1, wherein the 3D virtual environment includes positions for the user graphical representations and their corresponding virtual cameras arranged in a geometry, wherein the adjustments of the position and orientation of the virtual cameras are controlled based on a horizontal rotation or lateral movement of the key facial landmarks so that the virtual cameras are moved on a predetermined path arranged in the geometry.

9. The method of claim 1, comprising associating one or more axes of movement of the first virtual camera to one or more head movements.

10. A system for video communications, comprising:
    at least one computer of a computer system with memory and at least one processor implementing a 3D virtual environment configured to be accessed by a plurality of client devices, each having a corresponding user graphical representation within the 3D virtual environment, each user graphical representation having a corresponding virtual camera comprising a view of the 3D virtual environment presented through a display to the corresponding users of the client devices;
    a data exchange management module implemented in memory and configured to receive head tracking metadata of a first client device that comprises 6 degrees of freedom head tracking information generated in response to tracking movement of key facial landmarks obtained from video of a face of a first user of the first client device, wherein a first virtual camera comprises a view of the 3D virtual environment presented to the first user; and
    a machine vision module implemented in memory and configured to identify graphical elements within a field of view of a second virtual camera comprising a view of the 3D virtual environment presented to a second user of at least one second client device, wherein the identified graphical elements comprise a user graphical representation of the first user, wherein the machine vision module is further configured to send to the second client device, via the data exchange management module, the head tracking metadata of the first client device and the identified graphical elements, and wherein the system enables exchanging video and audio data between users of the 3D virtual environment to provide video communications in the 3D virtual environment;
    wherein the machine vision module is further configured to associate the view of the first virtual camera to the coordinates of the key facial landmarks, track movement of the key facial landmarks in 6 degrees of freedom based on the movement of the head of the first user, and adjust the position and orientation of the first virtual camera based on the tracked movement of the key facial landmarks.

11. The system of claim 10, wherein the second client device is configured to:
   receive the head tracking metadata to adjust movement of a head of the user graphical representation of the first user; and
   render and present a modified presentation of the view of the second virtual camera including the user graphical representation of the first user and corresponding graphical elements.

12. The system of claim 10, wherein the key facial landmarks along with their coordinates are obtained and identified from color image frames of the first user.

13. The system of claim 10, wherein the machine vision module implements threshold values for one or more of the degrees of freedom to limit the adjustments in the position and orientation of the virtual camera.

14. The system of claim 13, wherein the machine vision module implements the threshold values such that the movement of the head in each of the degrees of freedom results in a corresponding change of the virtual camera only after reaching the threshold value.

15. The system of claim 13, wherein the machine vision module implements the threshold values such that the movement of the virtual camera associated with the movement of the head in each of the degrees of freedom is stopped after reaching the threshold value.

16. The system of claim 10, wherein the machine vision module implements a multiplier value for one or more of the degrees of freedom, resulting in an increased movement of the virtual camera with respect to each movement of the head.

17. The system of claim 10, wherein the 3D virtual environment includes positions for the user graphical representations and their corresponding virtual cameras arranged in a geometry, and wherein the adjustments of the position and orientation of the virtual cameras are controlled based on a horizontal rotation of the key facial landmarks so that the virtual cameras are moved on a predetermined path arranged in the geometry.

18. A non-transitory computer-readable medium having stored thereon instructions configured to cause at least one server computer comprising a processor and memory to perform steps comprising:
   implementing a 3D virtual environment configured to be accessed by a plurality of client devices, each having a corresponding user graphical representation within the 3D virtual environment, each user graphical representation having a corresponding virtual camera comprising a view of the 3D implementing a 3D virtual environment configured to be accessed by a plurality of client devices, each having a corresponding user graphical representation within the 3D virtual environment, each user graphical representation having a corresponding virtual camera comprising a view of the 3D virtual environment presented through a display to the corresponding users of the client devices, wherein the at least one server computer enables exchanging video and audio data between users of the 3D virtual environment to provide video communications in the 3D virtual environment;
   receiving head tracking metadata of a first client device that comprises head tracking information generated in response to tracking movement of key facial landmarks obtained from video of a face of a first user of the first client device;
   associating the view of the first virtual camera to the coordinates of the key facial landmarks;
   tracking movement of the key facial landmarks in the 6 degrees of freedom based on the movement of the head of the first user;
   adjusting the position and orientation of the first virtual camera based on the tracked movement of the key facial landmarks;
   identifying graphical elements within a field of view of a virtual camera of a second client device, wherein the identified graphical elements comprise a user graphical representation of the first user; and
   sending, to the second client device, the head tracking metadata of the first client device and the identified graphical elements.

* * * * *